(12) United States Patent
Sadai

(10) Patent No.: US 9,942,369 B2
(45) Date of Patent: Apr. 10, 2018

(54) MOBILE ELECTRONIC TERMINAL HOLDER

(71) Applicant: Satoru Sadai, Osaka (JP)

(72) Inventor: Satoru Sadai, Osaka (JP)

( * ) Notice: Subject to any disclaimer, the term of this patent is extended or adjusted under 35 U.S.C. 154(b) by 0 days.

(21) Appl. No.: 15/120,684

(22) PCT Filed: Jun. 19, 2015

(86) PCT No.: PCT/JP2015/067680
§ 371 (c)(1),
(2) Date: Aug. 22, 2016

(87) PCT Pub. No.: WO2016/002536
PCT Pub. Date: Jan. 7, 2016

(65) Prior Publication Data
US 2017/0324852 A1 Nov. 9, 2017

(30) Foreign Application Priority Data

Jul. 4, 2014 (JP) .................................. 2014-138252

(51) Int. Cl.
*H04M 1/00* (2006.01)
*H04M 1/02* (2006.01)
(Continued)

(52) U.S. Cl.
CPC ........ *H04M 1/0281* (2013.01); *H04B 1/3888* (2013.01); *H04M 1/04* (2013.01); *H04M 1/72527* (2013.01)

(58) Field of Classification Search
CPC .. H04M 1/0281; H04M 1/04; H04M 1/72527; H04B 1/3888
See application file for complete search history.

(56) References Cited

U.S. PATENT DOCUMENTS 9,028,484 B2 * 5/2015 Craig ..................... A61B 42/10
606/32
9,342,174 B2 5/2016 Watanabe et al.
(Continued)

FOREIGN PATENT DOCUMENTS

JP   H09-325940 A   12/1997
JP   2004-104496 A   4/2004
(Continued)

OTHER PUBLICATIONS

International Search Report for PCT/JP2015/067680, ISA/JP, with English translation, dated Jul. 21, 2015.
(Continued)

*Primary Examiner* — Dominic Rego
(74) *Attorney, Agent, or Firm* — Harness, Dickey & Pierce, P.L.C.

(57) ABSTRACT

A mobile electronic terminal holder attached to a substantially quadrangular-tabular mobile electronic terminal having a front face including an input unit for inputting by finger pressing, a back face opposite the front face, and a lateral face between the front face and back face, includes an arm projecting perpendicular to the front face, from a vicinity of the lateral face of the input unit. A tip of the arm extends forward from the front face by approximately the length from between the index and middle fingers to the ball of the thumb. While pressing the input unit with the thumb, the mobile electronic terminal is held by the tip of the arm lodged against the center portion of the palm, the back face being supported by fingers except the thumb, and the mobile electronic terminal and the arm being gripped between the center portion of the palm and the fingers.

15 Claims, 18 Drawing Sheets

(51) Int. Cl.
  *H04M 1/04* (2006.01)
  *H04B 1/3888* (2015.01)
  *H04M 1/725* (2006.01)

(56) References Cited

U.S. PATENT DOCUMENTS

| | | | |
|---|---|---|---|
| 2006/0065740 A1* | 3/2006 | Lyons | G06K 19/072 235/492 |
| 2007/0018948 A1 | 1/2007 | Chen et al. | |
| 2008/0242343 A1* | 10/2008 | Koh | H04M 1/27455 455/550.1 |
| 2012/0299864 A1* | 11/2012 | Tong | G06F 1/1628 345/174 |
| 2013/0053113 A1 | 2/2013 | Linhardt | |
| 2013/0194208 A1* | 8/2013 | Miyanaka | G06F 3/041 345/173 |
| 2014/0117177 A1* | 5/2014 | Shamsadov | H05K 7/00 248/205.1 |
| 2014/0185262 A1* | 7/2014 | Hashimoto | F16M 13/00 361/809 |
| 2014/0320746 A1* | 10/2014 | Sato | H04N 5/64 348/725 |
| 2014/0355805 A1* | 12/2014 | Park | H04N 5/64 381/333 |
| 2015/0022475 A1 | 1/2015 | Watanabe et al. | |
| 2015/0061699 A1* | 3/2015 | Kim | G01B 7/00 324/655 |

FOREIGN PATENT DOCUMENTS

| | | |
|---|---|---|
| JP | 2008-187522 A | 8/2008 |
| WO | WO-2007/014041 A1 | 2/2007 |
| WO | WO-2013-118769 A1 | 8/2013 |

OTHER PUBLICATIONS

Written Opinion of the ISA fo PCT/JP2015/067680, ISA/JP, dated Jul. 21, 2015.

Written Opinion of the ISA for PCT/JP2015/067680, ISA/JP, dated Jul. 21, 2015, with English translation.

* cited by examiner

MOBILE ELECTRONIC TERMINAL HOLDER

CROSS-REFERENCE TO RELATED APPLICATIONS

This application is a 371 U.S. National Stage of International Application No. PCT/JP2015/067680, filed Jun. 19, 2015, which claims the benefit of and priority to Japanese Patent Application No. 2014-138252, filed Jul. 4, 2014. The disclosures of the above applications are incorporated herein by reference.

TECHNICAL FIELD

The present invention relates to a holder and a holding method which improve operability of a mobile electronic terminal while the mobile electronic terminal is held and viewed from below.

BACKGROUND ART

Mobile electronic terminals are portable electronic devices for inputting and outputting information, and refer to mobile phones, mobile personal computers, electronic dictionaries, electronic organizers, mobile game devices, etc. Among these, the present invention is suitable for mobile electronic terminals that have a substantially quadrangular tabular overall shape, and have a front face which includes an input unit for inputting by pressing using a finger. Typical mobile electronic terminals are mobile phones called smartphones. Due to the recent popularity of smartphones and the advance toward larger screens, smartphones are changing in form, from small smartphones that can be easily held in a hand, to large-size smartphones. Whereas the conventional screen size of a smartphone is 4 inches or less diagonally, smartphones with a screen size of about 5 inches or more diagonally are recently seeing a significant increase in market share. Naturally, when the size of the screen increases, the overall dimensions also increase. Whereas smartphones with the conventional screen size of about 4 inches had a width of 6 cm or less, current smartphones now have bigger screen sizes, and consequently, smartphones with a width in excess of 6 cm are proliferating.

Inputting on such smartphones is typically done by pressing on a display screen using a finger. More specifically, recent years have seen the wide use of an inputting method which receives input by detecting the electrostatic capacitance of the finger. The pressing on the display face is often performed using a thumb or an index finger. When pressing is performed using a thumb, the thumb of the hand holding the smartphone is used, and, when the pressing is performed using an index finger, the index finger of the hand which is not holding the smartphone is used. In other words, whereas using the index finger requires the smartphone to be handled using both hands, using the thumb allows the smartphone to be used with just one hand, and thus it can be said that, typically, inputting using the thumb is more convenient.

Since the front face of the smartphone is pressed when thumb-inputting on a smartphone, the smartphone naturally needs to be fixed. When the size of the smartphone is small, that is, the width is narrow, the smartphone can be fixed by being sandwiched between the tips of the index finger, ring finger, etc. on one of the left and right lateral faces of the smartphone, and the ball of the thumb or ball of the little finger, etc. of the palm on the other. However, when a large smartphone with a width exceeding 6 cm is gripped in the above manner, the all-important movable region of the thumb decreases, and thus the area that cannot be pressed for inputting is enlarged. In view of this, in order to be able to sufficiently perform inputting using the thumb by changing the manner of holding the smartphone, many people perform inputting using a method in which thumb inputting is performed while the smartphone is placed on the pads of three fingers: the index finger, the middle finger, and the ring finger. However, with this inputting method, the smartphone is merely placed on the fingertips, and thus there is the disadvantage that the smartphone is prone to dropping. Furthermore, when inputting while lying on a sofa or bed, the vertical relationship between the fingers and the smartphone is reversed such that the smartphone will certainly fall off from the hand and inputting is out of the question.

Means for reliably holding and preventing such dropping of a smartphone include a method of fixing the smartphone to an arm stand. Specifically, there is a method of hands-free drop prevention in which the base portion of an arm stand having a long support column is fixed to an edge of the sofa or bed, and the smartphone is attached to the tip of the support column. FIG. 36 is a perspective view of a conventional mobile electronic terminal holder when in use. As seen from FIG. 36, arm stand 51 is fixed by sandwiching sofa edge or bed headboard 56 between clamp 54, and tightening wing screw 55. Smartphone 1 is attached by being clamped using clip 52 at the tip of support column 53. In other words, smartphone 1 is fixed by being pinched by a large clip 52 which is closed by a spring. Since the angle of support column 53 can be changed freely while holding, smartphone 1 can be fixed with the front face facing downward. Then, when the user lies on the bed in such a way that the user's head and hands are positioned below smartphone 1 which is fixed with the front face facing downward, inputting using a fingertip while lying down and looking up at the screen of smartphone 1 can be performed easily.

However, this inputting method has various disadvantages. First, the respective operations of fixing the bed and arm stand together and fixing the smartphone and arm stand together are troublesome. Next, the smartphone can only be used in the area at which it is fixed. Furthermore, the stand itself is heavy and bulky, and thus cannot be freely brought anywhere. In addition, if the support column is soft, the smartphone will shake when pressed with a finger during inputting, which makes inputting difficult.

In view of the above-described points, the present invention provides a mobile electronic terminal holder which prevents the mobile electronic terminal from easily falling off the hand during inputting, allows single-handed inputting even when inputting while lying down, and is easy to carry around.

CITATION LIST

Patent Literature

[PTL 1] Japanese Unexamined Patent Application Publication No. 2012-125466
[PTL 2] Japanese Unexamined Patent Application Publication No. 2004-012606
[PTL 3] Japanese Unexamined Patent Application Publication No. 2003-232309

SUMMARY OF INVENTION

Technical Problem

The increase in the size of smartphones has lead to problems such as the hold on the smartphone being unstable during single-handed inputting which results in the smartphone being prone to dropping, and that single-handed inputting while lying down and viewing the smartphone from below is not possible, etc.

Solution to Problem

In order to solve the aforementioned problem, the present invention provides a mobile electronic terminal holder which (i) includes an arm that is (a) fixed to a substantially quadrangular tabular mobile electronic terminal, such as a smartphone, having a front face that includes an input unit for inputting by pressing using a finger, a back face, and a side face, and (b) projects perpendicular to the front face, from the vicinity of the lateral face just beside the input unit, and (ii) allows the mobile electronic terminal to be held by having the center portion of the palm placed against the tip of the arm, having fingers other than the thumb being placed over the back face, and having the mobile electronic terminal sandwiched between the palm and the fingers other than the thumb.

The holder allows the mobile electronic terminal to be fixed firmly by being sandwiched between the palm and the index finger, middle finger, and ring finger, and thus, even when the mobile electronic terminal is held upside down, the mobile electronic terminal does not drop. In addition, because the thumb can be used freely, it is possible to perform inputting on the mobile electronic terminal that is in the upside-down state, from an angle for viewing from below.

Advantageous Effects of Invention

The mobile electronic terminal holder enables reliable holding of a mobile electric terminal, and inputting using only one hand even while lying down.

DESCRIPTION OF EMBODIMENTS

Hereinafter, embodiments of the present invention will be described with reference to the drawings.

[Embodiment 1]

Figure 1:
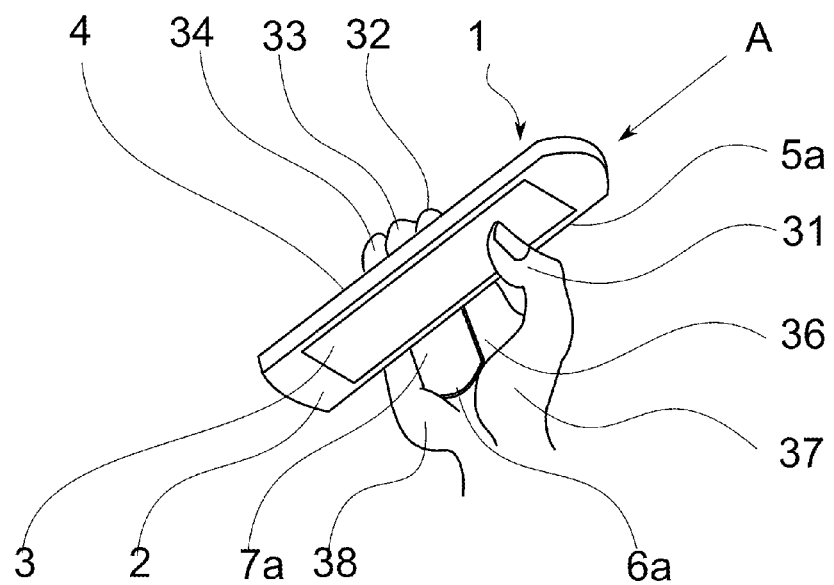
FIG. 1 is a perspective view of a mobile electronic terminal holder in Embodiment 1 of the present invention, when in use.
Figure 2:
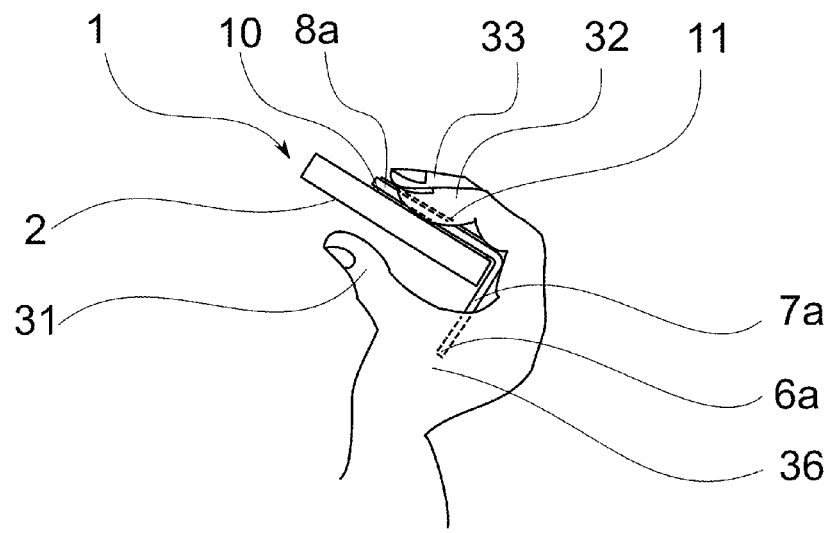
FIG. 2 is an arrow view of the mobile electronic terminal holder in Embodiment 1 of the present invention, when in use.
Figure 3:
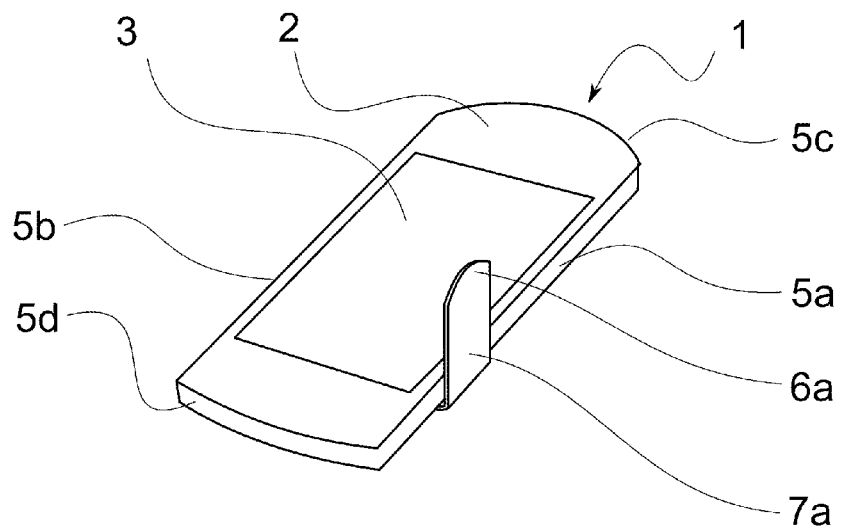
FIG. 3 is a perspective view of the front face of the mobile electronic terminal holder in Embodiment 1 of the present invention.
Figure 4:
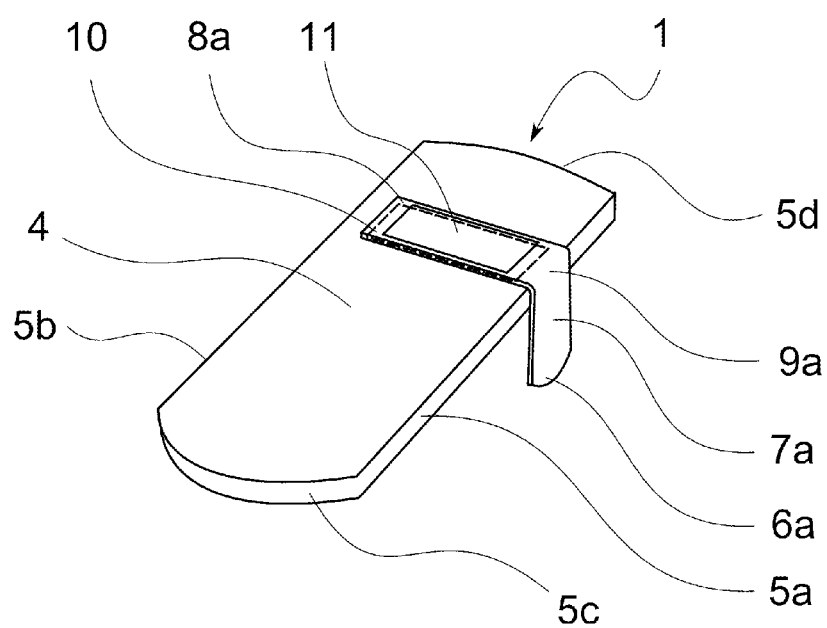
FIG. 4 is a perspective view of the back face of the mobile electronic terminal holder in Embodiment 1 of the present invention.
Figure 5:
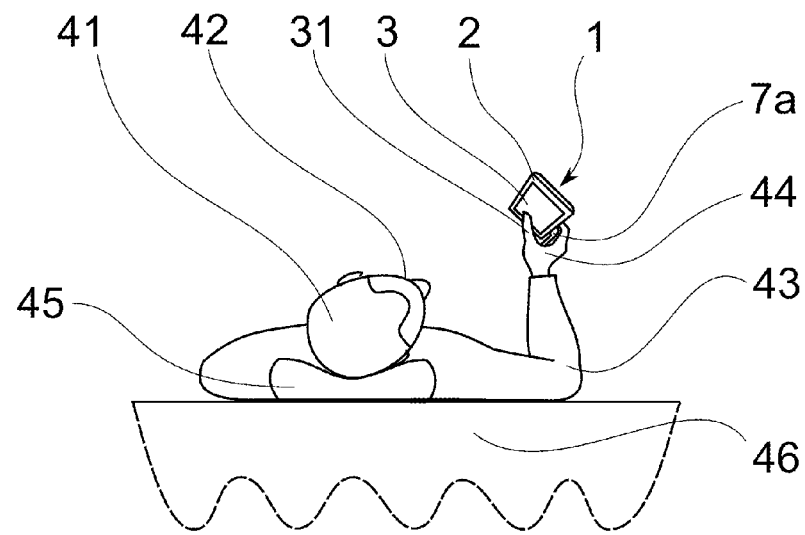
FIG. 5 is a front view of a user of the mobile electronic terminal holder in Embodiment 1 of the present invention.

The configuration of a mobile electronic terminal holder in Embodiment 1 will be described with reference to FIG. 1 to FIG. 5. FIG. 1 is a perspective view of a mobile electronic terminal holder in Embodiment 1 of the present invention, when in use. FIG. 2 is an arrow view of the mobile electronic terminal holder in Embodiment 1 of the present invention, when in use. FIG. 3 is a perspective view of the front face of the mobile electronic terminal holder in Embodiment 1 of the present invention. FIG. 4 is a perspective view of the back face of the mobile electronic terminal holder in Embodiment 1 of the present invention. FIG. 5 is a front view of a user of the mobile electronic terminal holder in Embodiment 1 of the present invention.

In FIG. 3, front face 2 of mobile electronic terminal 1 includes input unit 3. Input unit 3 has a structure which simultaneously allows displaying through liquid crystal. As a specific example of the mobile electronic terminal, mobile electronic terminal 1 is a smartphone that is approximately 12 cm long, 7 cm wide, and 1 cm thick. The lateral face of mobile electronic terminal 1 is divided into 4, namely, lateral face 5a on the right, lateral face 5b on the left, lateral face 5c at the top, and lateral face 5d at the bottom. Arm 7a is attached to mobile electronic terminal 1 to project from just beside input unit 3 in the vicinity of lateral face 5a of mobile electronic terminal 1, in a direction substantially perpendicular to the front face. Arm tip 6a located at the tip of arm 7a extends forward by approximately 4 cm from front face 2. Here, forward refers to a direction perpendicular to front face 2 and heading outward from mobile electronic terminal 1. FIG. 4 illustrates the back face of the same mobile electronic terminal 1 in FIG. 3. Common components are assigned the same reference signs. Arm 7a and fixing portion 8a are fabricated from a highly rigid, 5 cm-wide piece of a tabular material, such as metal, which is bent 90 degrees in the vicinity of lateral face 5a at bent portion 9a. Arm 7a, fixing portion 8a, and bent portion 9a form the holder. Fixing portion 8a is fixed to the backside of mobile electronic terminal 1 by being stuck using adhesive 10 located on the inward-facing side of fixing portion 8a. Arm 7a projects from the vicinity of lateral face 5, in a direction substantially perpendicular to front face 2. Arm tip 6a is fixed to extend approximately 4 cm past front face 2 by way of the fixing of fixing portion 8a and the high rigidity of the tabular material making up arm 7a. Furthermore, the outer face of fixing portion 8a includes rough face portion 11 having fine bumps and depressions, and is thus grippy.

The manner in which mobile electronic terminal 1 and the holder configured in the manner illustrated in FIG. 1 is actually held in a hand and used will be described. Structural components that are identical as those in FIG. 3 and FIG. 4 are assigned the same reference signs. When holding mobile electronic terminal 1 and the holder with the right hand, arm tip 6a is placed at the center of palm 36 of the right hand. Arm tip 6a is wide with a maximum width of 5 cm and rounded, and thus does not strongly dig into palm 36. It is preferable that arm tip 6a be placed against a portion of palm 36 immediately inward of ball-of-the-thumb 37, which is the thick portion of palm 36 extending from the base of the thumb, or ball-of-the-little finger 38, which is the thick portion of palm 36 extending from the base of the little finger. This is because the above-described placement makes it easier for arm tip 6a to catch onto the palm. Then, the fingers other than thumb 31, that is, index finger 32, middle finger 33, ring finger 34, and the little finger (not illustrated) are curled over back face 4 of mobile electronic terminal 1 to press against back face 4. At this time, the fingers also simultaneously press against fixing portion 8a which is fixed onto back face 4. Although the outer face of fixing portion 8a is a flat face, the presence of rough face portion 11 prevents the fingers from slipping. Then, mobile electronic terminal 1 and arm 7a are gripped lightly so as to be sandwiched between palm 36 and the fingers other than thumb 31. Since the fingers do not slip due to the friction caused by rough face portion 11 and arm tip 6a also catches onto palm 36 even when mobile electronic terminal 1 and the holder are gripped, mobile electronic terminal 1 can be fixed against the hand and held steadily in the right hand.

FIG. 2 is used to describe the holding by gripping at this time, in a more easily understandable manner. FIG. 2 is an arrow view as seen from the direction of arrow A in FIG. 1. Structural components that are identical as those in FIG. 1, FIG. 3, and FIG. 4 are assigned the same reference signs. Although stress due to gripping force is imparted to mobile electronic terminal 1 and arm 7a which are gripped between palm 36 and the fingers other than thumb 31 such as index finger 32, middle finger 33, etc., arm 7a and fixing portion 8a are connected at bent portion 9a and have high rigidity, and thus practically do not deform. Mobile electronic terminal 1 and fixing portion 8a are fixed by adhesive 10. In addition, the fingers other than the thumb are pressed against rough face portion 11 provided in the flat face of fixing portion 8a and stay still due to static friction force, and arm tip 6a slightly digs into and stays caught in palm 36. The hold becomes stable according to the form seen in the figure. In addition, even when gripping is done with slight force, arm 7a, bent portion 9a, and fixing portion 8a are highly rigid and thus practically do not deform. Arm tip 6a extends approximately 4 cm past front face 2.

It should be noted that as a slip stopper of rough face portion 11 which serves as a slip stopper, the outer face of fixing portion 8a may be roughened through sandblasting, etc., or a cushion material such as urethane foam having high frictional force may be attached to the outer face of fixing portion 8a.

When mobile electronic terminal 1 and the holder are held in the above-described manner, thumb 31 of the right hand is completely uninvolved in the above-described holding mechanism using the right hand, and can thus move freely and independently of the holding. Aside from allowing the first joint and the second joint of thumb 31 to move freely, ball-of-the-thumb 37 can also be moved. In addition, since arm tip 6a causes the portion inward of ball-of-the-thumb 37 to be suitably separated in the forward direction from input unit 3 of front face 2 by approximately the length from the fork between the index finger and middle finger up to the ball of the thumb, thumb 31 is able to press the respective portions of input unit 3 using only the tip of thumb 31. The importance and details of "pressing using only the tip" are described later.

In addition, since arm 7a projects from just beside input unit 3, placing arm tip 6a on palm 36 increases the area that can be pressed using the tip of thumb 31. Since palm 36 is at the position of arm tip 6a, and the distance from palm 36 to the tip of thumb 31 is limited, if the arm is not just beside the input unit, the area of the input unit that can be pressed using thumb 31 naturally decreases. However, because mobile electronic terminal 1 and the holder are held by being gripped between palm 36 and the fingers other than the thumb, the area which thumb 31 is able to press is slightly biased toward the top end of the input unit, that is, toward lateral face 5c at the top. In view of this, even if arm 7a is just beside the input unit, offsetting arm 7a slightly toward the bottom edge, that is, toward lateral face 5d, makes it easier for the tip of thumb 31 to reach the entirety of input unit 3.

Furthermore, arm 7a projects from the vicinity of lateral face 5a. Specifically, arm 7a projects forward of front face 2 at the position where arm 7a comes into contact with lateral face 5a. Since the palm is in the position of the arm tip, and the distance from the palm to the tip of the thumb is limited, if arm 7a were to project from a position that is far from lateral face 5, the thumb would be distanced from the input unit, and the area that can be pressed using thumb 31 decreases. Conversely, if the arm were to project past front face 2 of mobile electronic terminal 1 in a direction inward of lateral face 5a, the fact that input unit 3 occupies almost the entire area of front face 2 would create a situation in which inputting at the position of the base of the projecting arm would not be possible or the display at the base of the arm would not be visible. In other words, having the arm project from the vicinity of the lateral face is a suitable condition for thumb inputting. Specifically, if the separation is approximately 1 cm or more, there is the effect that the inputting range is reduced as distance increases.

Next, the importance of "pressing using only the tip" of the thumb will be described. If mobile electronic terminal 1 is gripped in a state where arm 7 is not provided, mobile electronic terminal 1 would be held, like a sandwich, flush between thumb 31 and the other fingers. Although this might allow mobile electronic terminal 1 to be held, the pad of thumb 31 would press against a wide area of the input unit during inputting, and thus the input area cannot be identified, which results in an input error or makes inputting impossible. In addition, if, as a different manner of holding, mobile electronic terminal 1 were held sandwiched between ball-of-the-thumb 37 and the fingers other than the thumb, thumb 31 would be displaced outward of lateral face 5a of mobile electronic terminal 1, and thus making inputting completely impossible. Since, in the present invention, this problem does not occur, and arm tip 6a causes ball-of-the-thumb 37 to be suitably distanced, it is possible to press only the tip of thumb 31 against input unit 3, and thus inputting in the single narrow area desired becomes possible.

Although the length of arm tip 6a from front face 2 is 4 cm in this embodiment, this length is merely an example. A length approximately from the fork between index finger 32 and middle finger 33 up to ball-of-the-thumb 37, in the forward direction from front face 2 is suitable. In other words, it is necessary that the base of thumb 31 is floating away from front face 2 in the forward direction by a suitable length. This length varies depending on the size of each individual's hands. Increasing this length increases the distance between thumb 31 and input unit 31, and thus the tip of the thumb will either be unable to reach the input unit or the area that can be reached becomes limited. Conversely, reducing this length increases the area that can be reached by the thumb, but causes the pad of the tip of thumb 31 to press simultaneously over a wide area of input unit 3, which causes input errors. In addition, if this length is short, that is, if the arm is low, gripping and fixing using palm 36 would require significant force. Typically, a range of approximately 2 cm to 7 cm is suitable; approximately 2 cm for a child or a person with small hands, and approximately 7 cm for a person with big hands.

A further major characteristic feature of the present invention is that mobile electronic terminal 1 does not drop even when front face 2 of mobile electronic terminal 1 is facing downward (the groundward direction) while arm 7a and mobile electronic terminal 1 are held in the above manner, and, in addition, inputting by pressing with the thumb can be done easily even when front face 2 is facing downward. FIG. 5 is a front view of a user of the mobile electronic terminal holder in Embodiment 1 of the present invention. The user is lying face up on bed 46 with head 41 on pillow 45 and right arm 43 extended sideways from his body, with the elbow bent upward in approximately a right angle. The user is lightly gripping mobile electronic terminal 1 and arm 7a using raised hand 44. Head 41 is facing slightly to the right so that face 42 faces mobile electronic terminal 1, and the user performs inputting on input unit 3 using thumb 31 of the right hand while looking up at front face 2.

Even in such a case, as described earlier, by lightly gripping mobile electronic terminal 1 and arm 7a between palm 36 (not illustrated) and the fingers other than thumb 31, mobile electronic terminal 1 can be fixed against the hand and thumb 31 can freely move with suitable spacing from input unit 3 In addition, since arm tip 6a (not illustrated) is positioned almost directly under (in the groundward direction) mobile electronic terminal 1, the weight of mobile electronic terminal 1 is supported by palm 36. Since arm 43 is almost directly under palm 36, the weight of mobile electronic terminal 1 is eventually supported by arm 43. In addition, since the right elbow is also on the bed, in the end, the weight of mobile electronic terminal 1 is supported not by the arm of the user but by the bed, and thus holding becomes easy. If the mobile electronic terminal were a tablet terminal which is heavier than a smartphone, the advantageous effect of such easy holding becomes even more remarkable.

It should be noted that arm tip 6a has a maximum width of 5 cm and is rounded, and thus does not strongly dig into palm 36. Therefore, palm 36 feels no pain even during prolonged holding. Furthermore, although placing arm tip 6a at the center portion of palm 36 is suitable because arm tip 6a is less prone to slipping even during gripping, placing arm tip 6 against the slightly recessed portion inward of ball-of-the-thumb 37 or ball-of-the-little finger 38, at the center portion of palm 36 in particular allows arm tip 6a to get caught in the recessed portion and become less prone to slipping. In order to make arm tip 6a even less prone to slipping, an elastic material such as rubber, a foam sponge, etc. can be used at the tip.

It should be noted that fixing portion 8a is fixed to mobile electronic terminal 1 using adhesive 10. Adhesive 10 in this embodiment uses an ester polyurethane polymer, and can be removed gradually from the edges when force is slowly applied to one part of the fixing portion. When the holder will not be used, adhesive 10 can be removed slowly as described above. Then, when the holder is to be used again, adhesive 10 adheres strongly some time after being pressed against mobile electronic terminal 1. However, the means by which fixing portion 8a is fixed is not limited to such an adhesive. If it is acceptable to keep the holder fixed even when not in use, a hardening adhesive such as epoxy may be used instead of the above-described adhesive. If easy attachment and detachment is desired, a method that can easily be implemented is to attach a circular suction disk made of flexible synthetic resin to the inward-facing side of fixing portion 8a and attaching/detaching the suction disk to and from mobile electronic terminal 1.

[Embodiment 2]

Figure 6:
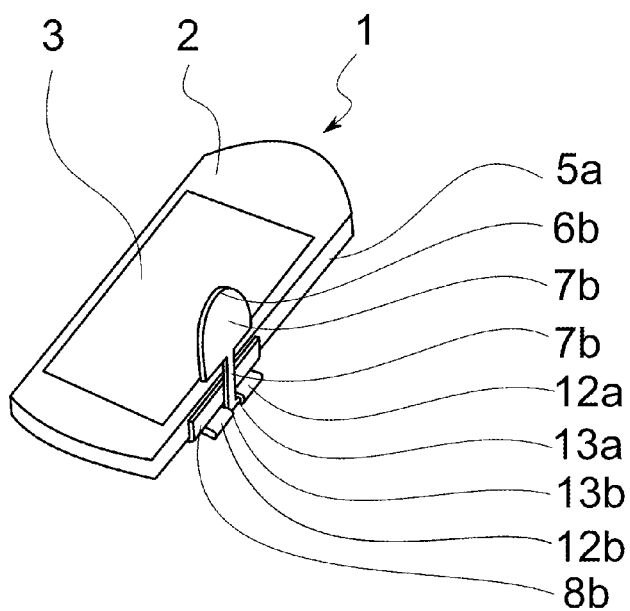
FIG. 6 is a perspective view of the front face of a mobile electronic terminal holder in Embodiment 2 of the present invention.

The configuration of a mobile electronic terminal holder in Embodiment 2 will be described with reference to FIG. 6 to FIG. 11. In the respective figures, structural elements that are identical to those in Embodiment 1 are assigned the same reference signs. Like FIG. 3, FIG. 6 is perspective view illustrating the state in which a holder is attached to mobile electronic terminal 1 as seen primarily from the front face 2-side of mobile electronic terminal 1. A smartphone is adopted as a specific example of the mobile electronic terminal. Fixing portion 8b, which is a part of the holder, has a portion that is in contact with lateral face 5a of mobile electronic terminal 1. The greater portion of fixing portion 8b is located on the back face 4-side of mobile electronic terminal 1, and adheres to mobile electronic terminal 1. Block 12a and block 12b, which are attached to the outer face of fixing portion 8b, each have a portion that protrudes slightly on the lateral face 5a-side. The greater portion of block 12a and block 12b is located on the back face 4-side. Arm 7b which has high rigidity is disposed between block 12a and block 12b. Arm 7 b includes a narrow base portion located close to block 12a and a rounded portion having a substantially semicircular tip. In other words, arm 7b has a narrow base and a wide tip. The end of the base of arm 7b is a shaft, and the ends of the shaft are inserted into shaft hole 13a and shaft hole 13b provided in block 12a and block 12b respectively, so as not to be detached. Arm 7b projects from the vicinity of lateral face 5a, which is just beside input unit 3 which also serves as a display unit, in a direction substantially perpendicular to front face 2. With the above-described mechanism, arm tip 6b extends forward by approximately 4 cm from front face 2.

Figure 7:
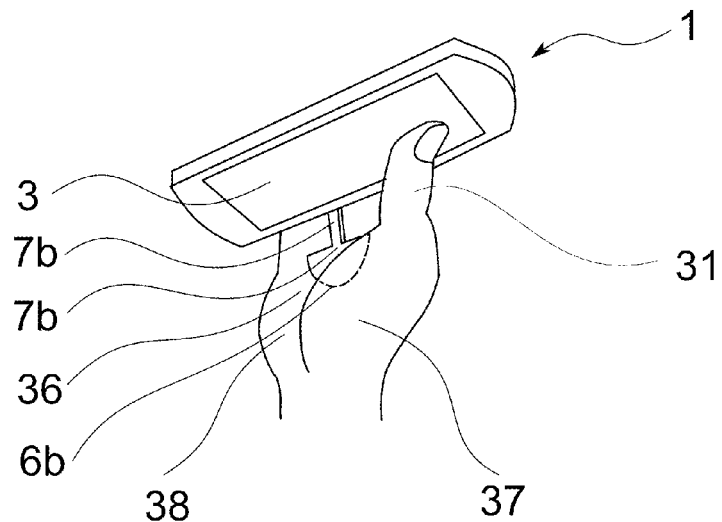
FIG. 7 is a perspective view of the mobile electronic terminal holder in Embodiment 2 of the present invention, when in use.

FIG. 7 is a perspective view of a mobile electronic terminal holder in Embodiment 2 of the present invention, when in use. In other words, like FIG. 1, FIG. 7 is a diagram illustrating an in-use state in which mobile electronic terminal 1 and the holder configured in the above-described manner are actually held in the hand. Structural components that are identical as those in FIG. 6 are assigned the same reference signs. Arm tip 6b is placed at the center of palm 36 of the right hand. It is preferable that arm tip 6b be placed against a portion of palm 36 immediately inward of ball-of-the-thumb 37, which is the thick portion of palm 36 extending from the base of the thumb, or ball-of-the-little finger 38, which is the thick portion of palm 36 extending from the base of the little finger. Then, the fingers (not illustrated) other than thumb 31 are curled over back face 4 of mobile electronic terminal 1 to press against back face 4. Then, mobile electronic terminal 1 and arm 7b are sandwiched between palm 36 and the fingers other than thumb 31, and gripped using light force. Since the fingers do not slip and arm tip 6a also catches onto palm 36 even when mobile electronic terminal 1 and the holder are gripped, mobile electronic terminal 1 can be fixed against the hand and held steadily in the right hand. Aside from frictional force, there is another major factor as to why the fingers that are curled over back face 4 do not slip. This will be described later in the description using FIG. 9.

Inputting on mobile electronic terminal 1 held in the above-described manner is the same as described in Embodiment 1. In other words, thumb 31 is completely uninvolved in the above-described holding mechanism, and can thus move freely and independently of the holding. In addition, since arm tip 6b provides ball-of-the-thumb 37 with an extension length of approximately 4 cm in the forward direction from front face 2, it is possible to press the respective areas of input unit 3 using only the tip of thumb 31. Moreover, mobile electronic terminal 1 does not drop even when front face 2 of mobile electronic terminal 1 is facing downward (the groundward direction) while arm 7a and mobile electronic terminal 1 are held in the above manner, and, in addition, inputting by pressing with the thumb can be done easily even when front face 2 is facing downward. In other words, it is possible to perform single-handed inputting on mobile electronic terminal 1 while lying face up and looking from below.

Furthermore, arm 7b located in the vicinity of lateral face 5a is in contact with fixing portion 8b along lateral face 5a. Fixing portion 8b has a thickness of approximately 2 mm. In other words, arm 7b is distanced 2 mm from lateral face 5a and projects forward along lateral face 5a to be approximately perpendicular to front face 2. Arm 7b is not directly in contact with lateral face 5a but is located in the vicinity of lateral face 5a. If the thickness of fixing portion 8b is increased, the arm would be distanced from the vicinity of lateral face 5a, and because palm 36 is at the position of arm tip 6a and the distance from palm 36 to the tip of thumb 31 is limited, the area that can be pressed using the thumb is reduced.

In the case arm 7b is separated from the vicinity of lateral face 5a as described above, there is a method for remedying the reduction in the area that can be pressed using thumb 31. This is by tilting arm 7b, which projects forward approximately perpendicular to front face 2, slightly toward front face 2 (inward). With this, arm tip 6b is brought slightly closer to input unit 3, and thus the area that can be pressed by thumb 31 is increased. In this case, even if arm 7b is tilted, as long as the tilt is up to approximately 20 degrees from perpendicular, the distance from arm tip 6b to front face 3 is reduced by only 7 percent compared to when fully perpendicular. However, if the tilt is too large, there is the risk that the arm might deform or break due to stress when force is applied for gripping during holding. As the angle of tilt veers farther away from perpendicular, the probability of deformation, etc. increases.

An additional characteristic feature of Embodiment 2 is that arm 7b can be folded. Mobile electronic terminals typically have a thin, tabular shape, and it is exactly this shape that makes them convenient to carry. However, when an arm that projects perpendicular to front face 2 is attached, the arm becomes a hindrance during carrying. It is better to remove the arm when not in use, implementing this is facilitated in Embodiment 2.

Figure 8:
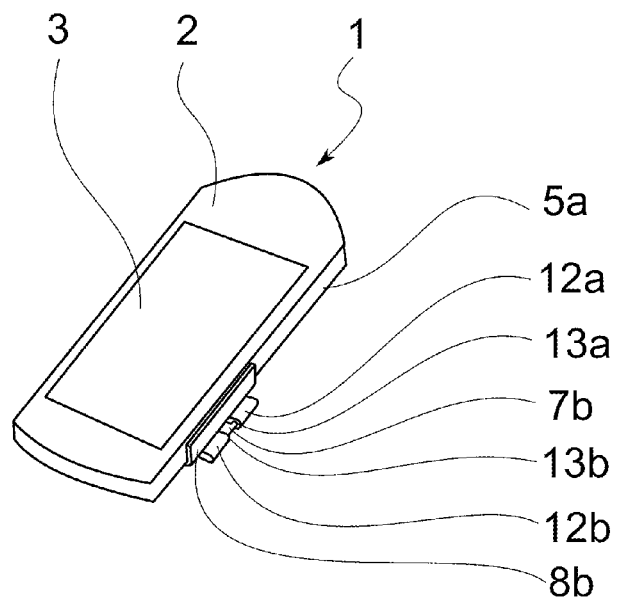
FIG. 8 is a perspective view of the front face of the mobile electronic terminal holder in Embodiment 2 of the present invention, when not in use.
Figure 9:
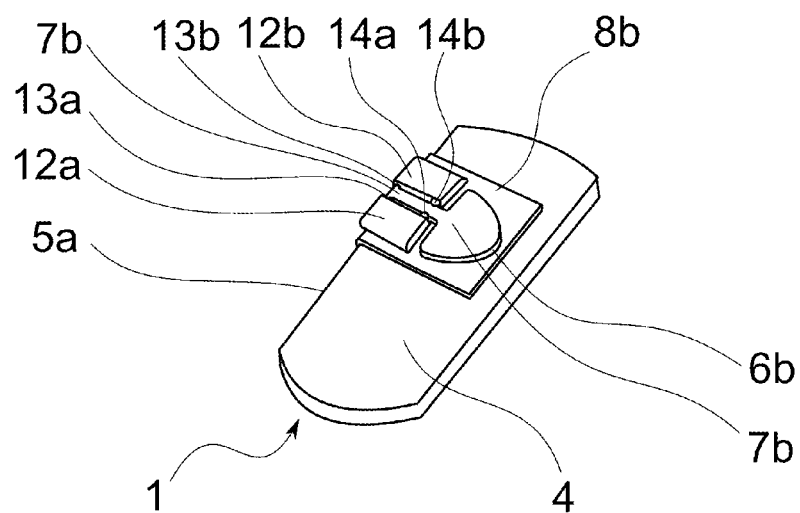
FIG. 9 is a perspective view of the back face of the mobile electronic terminal holder in Embodiment 2 of the present invention, when not in use.

This is described using FIG. 8 and FIG. 9. FIG. 8 is a perspective view of the front face of the mobile electronic terminal holder in Embodiment 2 of the present invention, when not in use. FIG. 9 is a perspective view of the back face of the mobile electronic terminal holder in Embodiment 2 of the present invention, when not in use. Structural components that are identical as those in FIG. 6 and FIG. 7 are assigned the same reference signs. In FIG. 9, fixing portion 8*b* of the holder fixed to back face 4 of mobile electronic terminal 1 by being stuck thereto. Block 12*a* and block 12*b* are fixed onto fixing portion 8*b*. Arm 7*b* which has a substantially semicircular tip and a narrow base is disposed between block 12*a* and block 12*b*. The end of the base of arm 7*b* serves as a rotating shaft of a hinge, and the ends of the shaft are inserted into shaft hole 13*a* and shaft hole 13*b* provided in block 12*a* and block 12*b* respectively, so as not to be detached. In addition, arm 7*b* swivels about the shaft that is inserted into shaft hole 13*a* and shaft hole 13*b* of the hinge provided in the vicinity of lateral face 5*a*. The rotating shaft is parallel to lateral face 5*a*. Arm 7*b*, which projects perpendicular to front face 2 in FIG. 6 and FIG. 7, swivels 270 degrees, and can be folded so as to be in flush contact with fixing portion 8*b* on back face 4, in as seen in FIG. 9.

It should be noted that, here, the hinge refers, not only to the typical hinge in which two metal sheets are coupled via a metal rod, but to a hinge in the broad meaning. In other words, the hinge refers to the mechanical mechanism in which two objects are coupled at a straight line section and swivel about the straight line section to allow the angle between the objects to be changed.

The folded appearance when seen from the front face-side is as illustrated in FIG. 8. Arm 7*b* which projected out is folded over the back face, and thus only the base of arm 7*b* is visible from the front face-side. When the arm is folded in the manner described above, mobile electronic terminal 1 is freed of large bulges and readily fits into bags, etc., and thus the holder becomes suitable for carrying around when not in use.

Furthermore, the folded appearance when seen from the back face-side is as illustrated in FIG. 9. Here, bumps 14*a* and 14*b* which project slightly are provided on the opposing sides of block 12*a* and block 12*b*, respectively, and arm 7*b* can be temporarily restrained by being held down by the bumps. Accordingly, when handling mobile electronic terminal 1 when not in use, the arm does not get in the way by swinging about.

The previously mentioned other major factor as to why the fingers that are curled over back face 4 do not slip, other than frictional force, will be described here. Block 12*a* and block 12*b* have a depth of approximately 3 cm along the back face 4-side from lateral face 5*a*. Block 12*a* and block 12*b* have a height of approximately 1 cm from fitting portion 8*b*. When in use, the tips of the fingers that are curled over back face 4 can be bent around and hooked onto the edges of the aforementioned approximately 1 cm protrusions located approximately 3 cm from lateral face 5*a*. Since the edges of block 12*a* and block 12*b* have the physical form of protrusions, the edges allow fingertips to easily hook on, and become bigger slip stoppers than typical frictional force, thereby allowing mobile electronic terminal 1 and arm 7 to be gripped securely. In other words, because the fingertips hook onto the two protrusions of block 12*a* and block 12*b* that are fixed to mobile electronic terminal 1, mobile electronic terminal 1 can be held securely and with ease.

Figure 10:
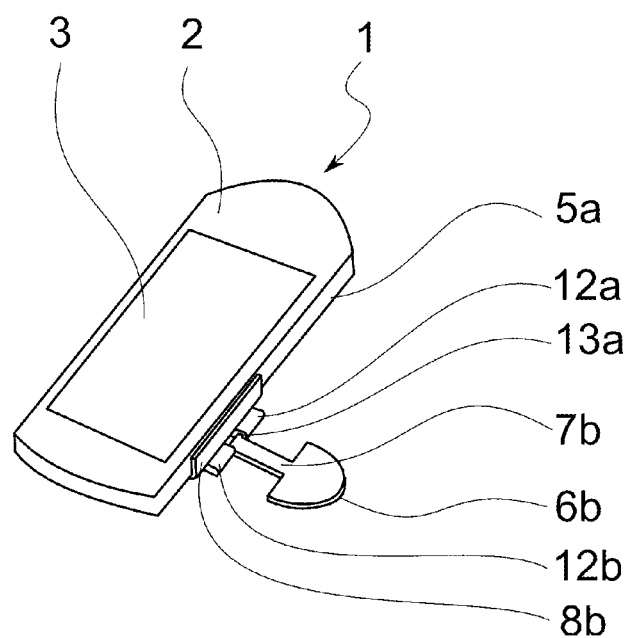
FIG. 10 is a perspective view of the front face of the mobile electronic terminal holder in Embodiment 2 of the present invention, when in use in a different manner.

Next, an additional application that can be performed with Embodiment 2 will be described. FIG. 10 is a perspective view of the front face of the mobile electronic terminal holder in Embodiment 2 of the present invention, when in use in a different manner. Structural components that are identical as those in FIG. 6 to FIG. 9 are assigned the same reference signs. In FIG. 10, arm 7*b* is not in contact with lateral face 5*a* and back face 4 of mobile electronic terminal 1. Arm 7*b* is swinging freely in a state where arm 7*b* is swiveled approximately 90 degrees from the state where arm 7*b* is in contact with lateral face 5, or more accurately, the state where arm 7*b* is in contact with fixing portion 8*b* which is in contact with lateral face 5*a*.

Figure 11:
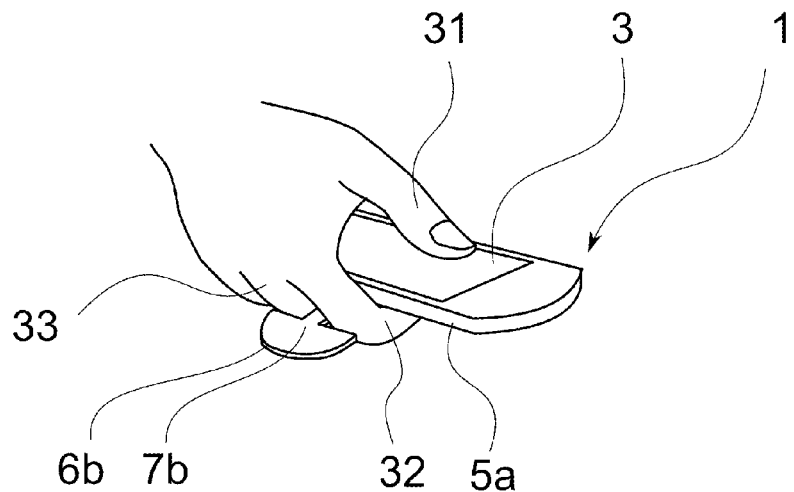
FIG. 11 is a perspective view of the mobile electronic terminal holder in Embodiment 2 of the present invention, when in use in a different manner.

FIG. 11 illustrates an example of use in which mobile electronic terminal 1 is held using the right hand when the arm is in the above-described state. FIG. 11 is a perspective view of the mobile electronic terminal holder in Embodiment 2 of the present invention, when in use in a different manner. Structural components that are identical as those in FIG. 6 to FIG. 10 are assigned the same reference signs. With respect to mobile electronic terminal 1 in the state illustrated in FIG. 10, index finger 32 and middle finger 33 of the right hand are extended from the front face 2-side to the back face 4-side so as to sandwich the narrow portion of arm 7*b* between index finger 32 and middle finger 33, and the fingertips of index finger 32 and middle finger 33 are hooked onto the edges of block 12*a* and block 12*b*. By doing so, the back portions of index finger 32 and middle finger 33 hit the semicircular portion which is the tip of arm 7*b*, and thus even when mobile electronic terminal 1 is about to slip off from the hand, the falling motion is stopped by the back portions, and mobile electronic terminal 1 does not fall off. In other words, steady holding is possible. This configuration, though not a primary point of the present invention, produces an auxiliary desirable effect of Embodiment 2.

It should be noted that although this embodiment shows an example in which the arm is foldable, it is possible to adopt a method of detaching the entire arm which becomes a hindrance when not in use, by pulling out the shaft which is inserted in shaft hole 13*a* and shaft hole 13*b*. In this case, the arm which projects in the front face 2-side of mobile electronic terminal 1 is eliminated when not in use, and thus allows mobile electronic terminal 1 and the holder to be carried in a compact state when being carried around.

[Embodiment 3]

Figure 12:
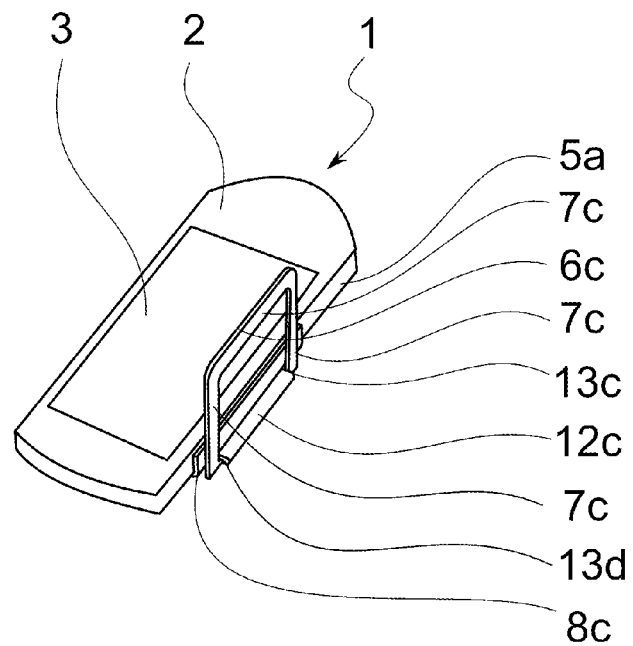
FIG. 12 is a perspective view of the front face of a mobile electronic terminal holder in Embodiment 3 of the present invention.

The configuration of a mobile electronic terminal holder in Embodiment 3 will be described with reference to FIG. 12 to FIG. 18. In the respective figures, structural elements that are identical to those in Embodiments 1 and 2 are assigned the same reference signs. Like FIG. 3, FIG. 12 is perspective view illustrating the state in which a holder is attached to mobile electronic terminal 1 as seen primarily from the front face 2-side of mobile electronic terminal 1. A smartphone is adopted as a specific example of the mobile electronic terminal. The 2 mm-thick fixing portion 8*c*, which is a part of the holder, is in contact with lateral face 5*a* of mobile electronic terminal 1. The greater portion of fixing portion 8*c* is located on the back face 4-side of mobile electronic terminal 1, and adheres to mobile electronic terminal 1. Block 12*c*, which is attached to the outer face of fixing portion 8*c*, has a portion that protrudes slightly on the lateral face 5*a*-side. Arm 7*c* having high rigidity is disposed across both sides block 12*a*. The base of Arm 7*c* is divided into two, both projecting forward in a direction substantially perpendicular to front face 2, from the vicinity of lateral face 5*a*. In addition, both tips of arm 7*c* are coupled and integrated to extend parallel to lateral face 5*a*. Stated differently, arm 7*c* is in the shape of the letter U, and has a hollow portion. The respective ends of the bases of the arm are shafts, and the tips of these shafts are inserted into shaft hole 13*c* and shaft hole 13*d* which are provided to block 12*c*, so as not to be detached. Since the base portions supporting arm 7*c* are secured and arm 7*c* has high rigidity, the entire length of arm tip 6*c* maintains an extension length of approximately 4 cm in the forward direction from front face 2. It should be noted that the entire length of arm tip 6*c* is approximately 10 cm.

Figure 13:
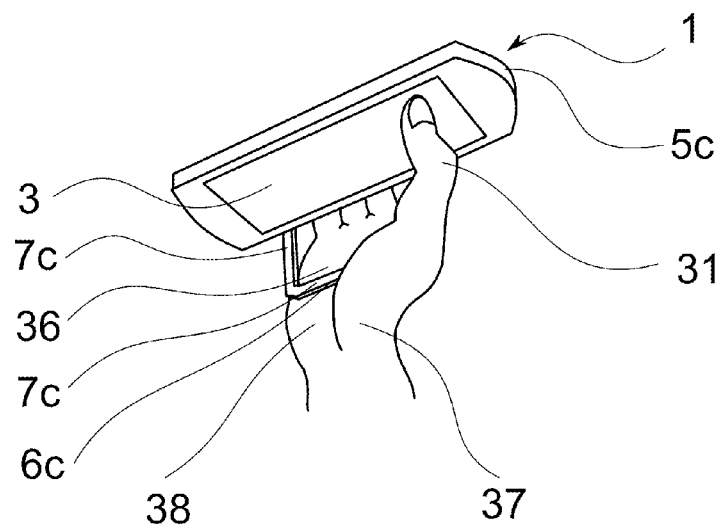
FIG. 13 is a perspective view of the mobile electronic terminal holder in Embodiment 3 of the present invention, when in use.

FIG. 13 is a perspective view of the mobile electronic terminal holder in Embodiment 3 of the present invention, when in use. Arm tip 6c is placed against the center of palm 36 of the right hand. In the manner of holding illustrated in FIG. 13, a portion of arm tip 6c which is close lateral face 5c at the top is placed against palm 36. The fingers other than thumb 31 are curled over back face 4 (not illustrated) of mobile electronic terminal 1 and hooked onto block 12c (not illustrated) positioned atop back face 4. The specific aspect of hooking the fingers onto block 12c will be discussed later together with FIG. 15c. Then, mobile electronic terminal 1 and arm 7c are gripped lightly using palm 36 and the fingers other than thumb 31. With this, mobile electronic terminal 1 can be fixed against the hand and held steadily in the right hand. The steadiness of this holding will also be described in more detail later together with FIG. 15. In addition, it is possible input by freely pressing on input unit 3 using the free thumb 31. In the manner of holding shown in FIG. 13, a portion of mobile electronic terminal 1 which is relatively close to the top end (lateral face 5c) is gripped, and thus the area that can be reached by the thumb is also primarily on the top end-side of input unit 3.

Figure 14:
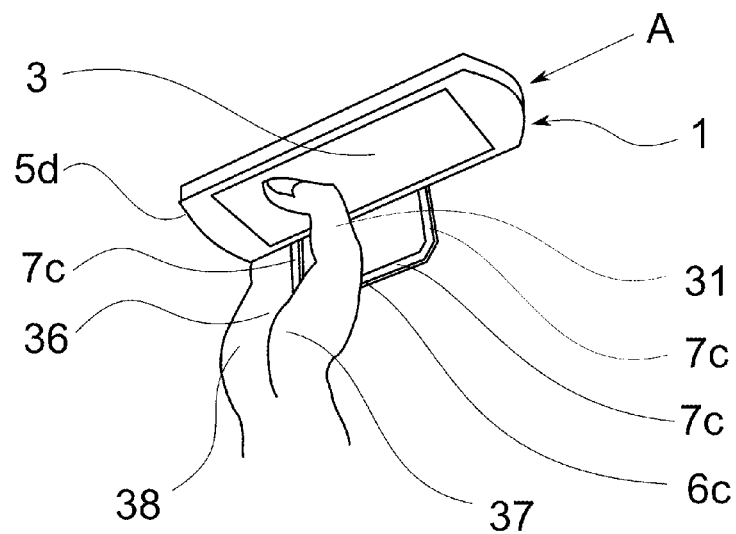
FIG. 14 is a perspective view of the mobile electronic terminal holder in Embodiment 3 of the present invention, when in use.

Next, the embodiment in which the manner of holding is slightly changed from that in FIG. 13 will be described. Although FIG. 14 is a perspective view of the mobile electronic terminal holder in Embodiment 3 of the present invention, a portion of mobile electronic terminal 1 which is close to the bottom end (lateral face 5d) is held by the hand. In the manner of holding illustrated in FIG. 14, a portion of arm tip 6c which is close lateral face 5d at the bottom is placed against palm 36. The fingers other than thumb 31 are curled over back face 4 (not illustrated) of mobile electronic terminal 1 and hooked onto block 12c (not illustrated) positioned atop back face 4. Then, mobile electronic terminal 1 and arm tip 6c are gripped lightly using palm 36 and the fingers other than thumb 31. With this, mobile electronic terminal 1 can be fixed against the hand and held steadily in the right hand. In addition, it is possible input by freely pressing on input unit 3 using the free thumb 31. In the manner of holding shown in FIG. 14, a portion of mobile electronic terminal 1 which is relatively close to the bottom end (lateral face 5d) is gripped, and thus the area that can be reached by the thumb is also primarily on the top end-side of input unit 3.

Figure 15:
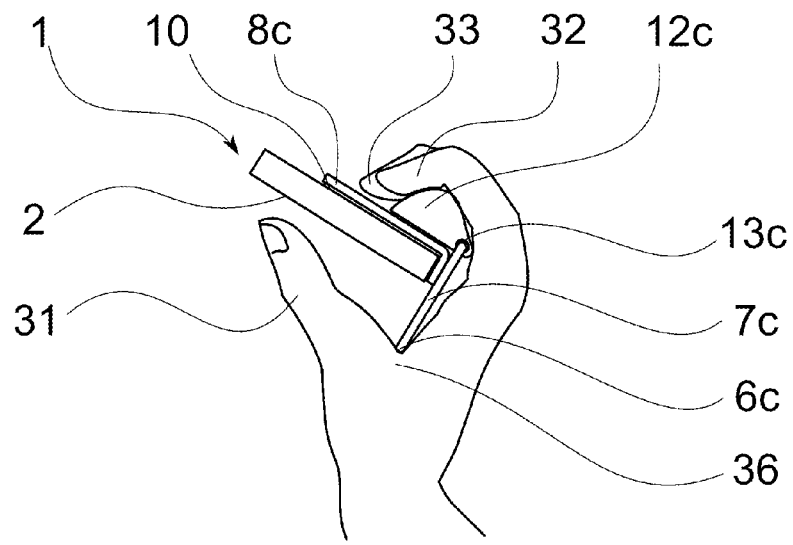
FIG. 15 is an arrow view of the mobile electronic terminal holder in Embodiment 3 of the present invention, when in use.

The above manner of holding will be described to better facilitate understanding. FIG. 15 is an arrow view of the mobile electronic terminal holder in Embodiment 3 of the present invention, when in use. FIG. 15 is a view as seen from the direction of arrow A in FIG. 14. Fixing portion 8c is fixed to mobile electronic terminal 1 by way of adhesive 10. Block 12c protrudes by a maximum height of approximately 2 cm and is securely fixed to fixing portion 8c. Block 12 is pivotally fixed to arm 7 by inserting the shafts of the bases of arm 7c into shaft holes 13c and 13d (not illustrated) of block 12c. In other words, arm 7c is located in the vicinity of the lateral face and swivels like a hinge having, as an axis of rotation, shaft holes 13c and 13d which have an axis of rotation that is parallel to the lateral face.

At this time, index finger 32, middle finger 33, the ring finger, and the little finger are hooked onto block 12c. Block 12c is approximately 2 cm high and 2 cm deep, and, in addition, has a rounded shape that fits the fingers. Accordingly, when the respective fingers are bent, the tips of the respective fingers go around and sufficiently hook on to the circumference of block 12c, and do not slip. The suitably high and deep protruding shape of the block catches the fingers and serves as a slip stopper. The suitable height and depth of the protrusion for securely hooking with the fingers is eventually determined by whether such dimensions allow gripping with palm 36 and the fingertips. For this reason, the length from arm tip 6c, which abuts palm 36, to the portion of block 12c which the fingers hook onto needs to be less than or equal to the length from ball-of-the-thumb 37 to the first joint of the middle finger. Specifically, the length needs to be approximately 12 cm or less even for a person with big hands. If the length from arm tip 6c to the portion of block 12c which the fingers hook onto exceeds 12 cm, the tips of the fingers will not be able to hook on and secure holding will not be possible. On the other hand, if the length from arm tip 6c to the portion of block 12c which the fingers hook onto is shorter, secure holding is possible by hooking on using the second joints of the respective fingers or curving the entire hand. However, if the length becomes too short, greater gripping force is required and the load on the hand increases. A length of about 6 cm to 9 cm is suitable for normal adult hands.

After hooking the finger tips, arm tip 6c is placed against palm 36 so as to grip with light force. Then, with the hinge mechanism centered on shaft holes 13c and 13d, arm 7c moves in the clockwise direction in FIG. 15 due to the stress caused by the gripping force. Arm 7c moves toward the lateral face 5a-side due to this force, and stops and stabilizes upon abutting fixing portion 8c beside lateral face 5a. In this manner, even with a mechanism in which arm 7c swivels and is not fixed, mobile electronic terminal 1 and arm 7c can be securely and steadily held by being gripped.

Here, the dimensions of block 12c will be described. The hooking of the fingers onto block 12c is an important condition for implementing this embodiment. In the present invention, gripping is performed using palm 36 and the fingers other than the thumb. At this time, the bases of the fingers other than the thumb normally come over to the position directly beside lateral face 5a. In order to bend the fingers other than the thumb from this position and hook the fingers onto block 12c, there are dimensional limitations. For the dimensions of block 12c that would allow at least the longest finger, middle finger 33, to hook on, it is preferable that the height be approximately 3 cm or less and the depth be approximately 3 cm or less, even for a person with big hands. If the block exceeds the above dimensions, it will be difficult for the fingers to hook on. Here, depth refers to the distance along back face 4, from lateral face 5a to the most distant portion of block 12c.

It should be noted that, in this manner, even when a fixing means is not provided between the arm and the lateral face and the arm moves freely, exerting force so as to grip causes the arm to hit the lateral face and become fixed and still. The same can also be said about previously described Embodiment 2 in which the arm moves freely in the same manner.

With regard to the degree of freedom of thumb 31, the inputting area that can be reached by the tip of the thumb is somewhat reduced in the manner of holding shown in FIG. 14. This is because arm tip 6c hits not only palm 36 but also the fork portion between thumb 31 and index finger 32, and movement of thumb 31 is restricted accordingly. However, all things considered, Embodiment 3 allows for easy changing of the manner of holding, such as holding at a portion close to the top end (lateral face 5c) of mobile electronic terminal 1 as in FIG. 13 or holding a portion close to the bottom end (lateral face 5d) of mobile electronic terminal 1 as in FIG. 14. Moreover, these holds can be changed by merely moving the hand to slide palm 36 along arm tip 6c. Then, as a result of changing between these holds, inputting over a wide overall area becomes possible. Therefore, this embodiment is beneficial to mobile electronic terminals having a large, vertically long input unit, that is, a large, vertically long screen.

Figure 16:
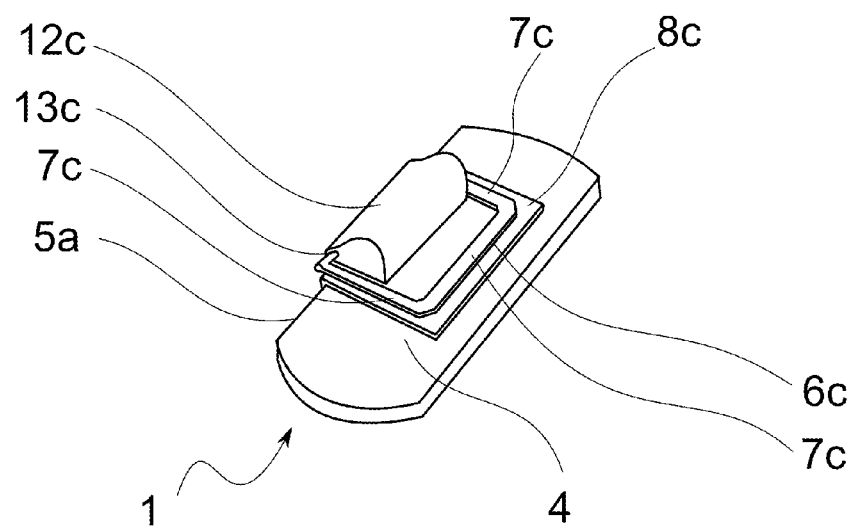
FIG. 16 is a perspective view of the back face of the mobile electronic terminal holder in Embodiment 3 of the present invention, when not in use.

FIG. 16 is a perspective view of the back face of the mobile electronic terminal holder in Embodiment 3 of the present invention, when not in use. When not using the arm, arm 7c, as a hinge, can swivel 270 degrees about shaft hole 13c and shaft hole 13d (not illustrated) provided in block 12c, and fold so as to come into contact with fixing portion 8c fixed to mobile electronic terminal 1. Since block 12c fits cleanly inside the hollow portion of the arm, arm 7c can be folded flat along the back face. When the arm is folded as illustrated in FIG. 16, mobile electronic terminal 1 is freed of large bulges, and thus the holder becomes suitable for carrying around when not in use.

Here, block 12c is a protrusion with a height of 2 cm. As described earlier, a height of 3 cm or less is a necessary dimension regarding gripping. However, taking portability into consideration, having a bulge of 3 cm from the back face would be a considerable hindrance. A height of about 2 cm, as in this embodiment, should be acceptable to typical users. In addition, a rounded shape with no corners as in this embodiment can more flexibly fit the fingers of various people, and is thus preferable.

Figure 17:
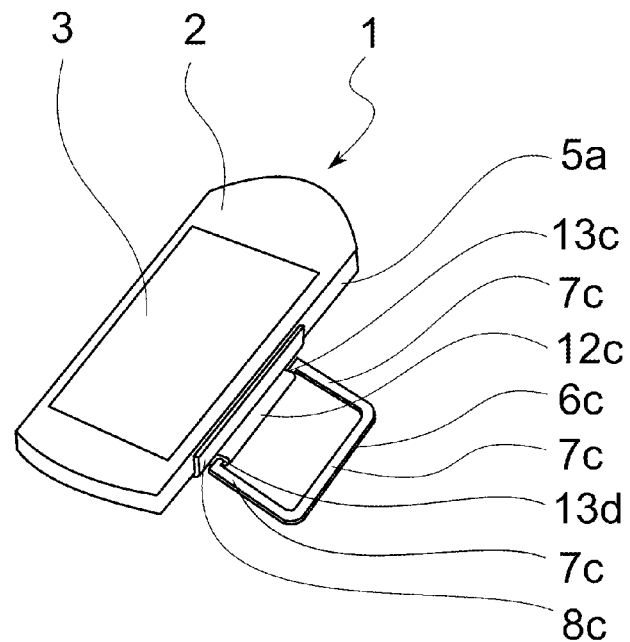
FIG. 17 is a perspective view of the front face of the mobile electronic terminal holder in Embodiment 3 of the present invention, when in use in a different manner.

Next, an additional application that can be performed with Embodiment 3 will be described. FIG. 17 is a perspective view of the front face of the mobile electronic terminal holder in Embodiment 3 of the present invention, when in use in a different manner. Structural components that are identical as those in FIG. 12 to FIG. 16 are assigned the same reference signs. In FIG. 17, arm 7c neither contacts fixing portion 8c on the lateral face 5a-side nor fixing portion 8c on the back face 4-side of mobile electronic terminal 1. Arm 7c is swinging freely in a state where arm 7c is swiveled approximately 90 degrees from the state where arm 7c projects forward past front face 2.

Figure 18:
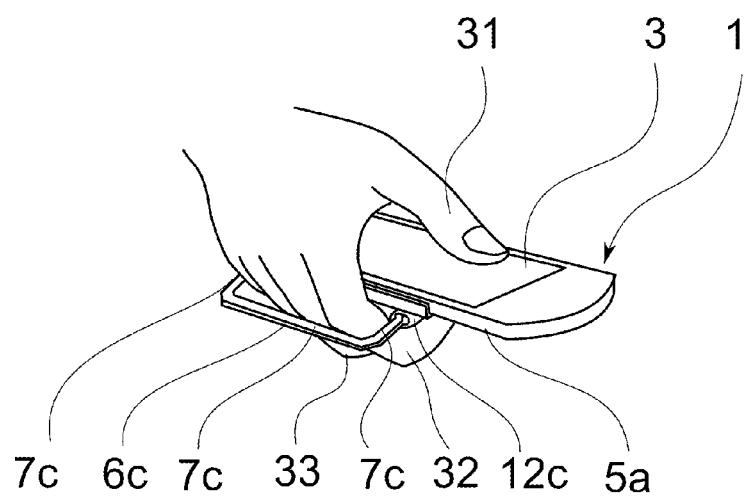
FIG. 18 is a perspective view of the mobile electronic terminal holder in Embodiment 3 of the present invention, when in use in a different manner.

FIG. 18 illustrates the state where mobile electronic terminal 1 is held using the right hand when the arm is in the above-described state. FIG. 18 is a perspective view of the mobile electronic terminal holder in Embodiment 3 of the present invention, when in use in a different manner. With respect to mobile electronic terminal 1 in the state illustrated in FIG. 17, index finger 32, middle finger 33, the ring finger, and the little finger of the right hand are inserted through the hollow portion of arm 7c. Then, the tips of the fingers are extended from the front face 2-side to the back face 4-side, and the fingertips are hooked onto block 12c. By doing so, the backside of the four fingers hit arm 7c, and thus, even if the hand should slip, the slipping is stopped by the back of the fingers, and thus mobile electronic terminal 1 does not fall from the hand and can be held steadily. This configuration, though not a primary point of the present invention, produces an auxiliary desirable effect by making use of the hollow portion of arm 7c in Embodiment 3.

It should be noted that, as a countermeasure for when arm 7c swivels freely and becomes a hindrance when not in use, it is possible to make an improvement by adding a configuration for temporary securing by providing, in fixing portion 8c or block 12c, bumps that temporarily secure a portion of arm 7c. These are the same as bump 14a and bump 14b described in FIG. 9 of Embodiment 2.

In this embodiment, an example in which arm 7c can be swiveled and folded is shown. However, it is also possible to adopt the method of detaching the arm which becomes a hindrance when not in use. It is also easy to adopt a design in which the entire arm 7c is detached by pulling out the ends of arm 7c which are inserted in shaft hole 13c and shaft hole 13d. In this case, the arm which projects in the front face 2-side of mobile electronic terminal 1 is eliminated when not in use, and thus can be carried around without taking up space.

Alternatively, changing the design drastically, there is also a method of providing a flexible, circular suction disk in the inward-facing side of block 12c, and substituting fixing portion 8c with the suction disk. By attaching the suction disk to mobile electronic terminal 1 when in use and detaching the suction disk when not in use, both block 12c and arm 7c can be detached. In this manner, a configuration that allows the entire holder to be attached and detached can be implemented.

[Embodiment 4]

Figure 19:
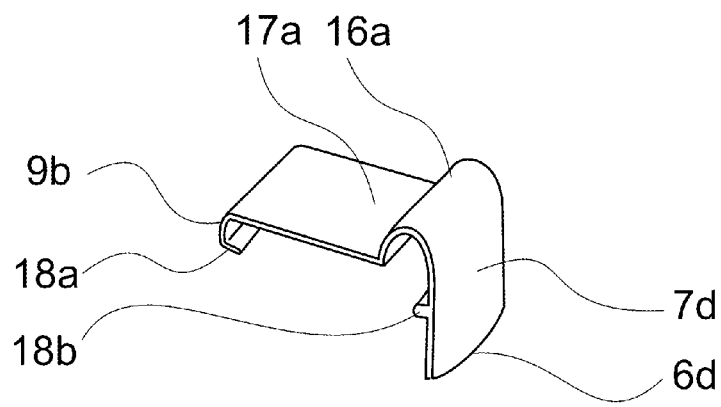
FIG. 19 is a perspective view of a mobile electronic terminal holder, on its own, in Embodiment 4 of the present invention.

The configuration of a mobile electronic terminal holder in Embodiment 4 will be described with reference to FIG. 19 to FIG. 21. In the respective figures, structural elements that are identical to those in Embodiments 1, 2, and 3 are assigned the same reference signs. FIG. 19 is a perspective view of the mobile electronic terminal holder, on its own, in Embodiment 4 of the present invention. The holder is almost entirely configured from a single plastic board that is 2 mm thick and 6 cm wide. A portion of the plastic board is arm 7d and the tip of arm 7d is arm tip 6d. Curved portion 16a is provided continuing from arm 7d, and is concave on the mobile electronic terminal 1-side or, in other words, is outwardly convex. Flat portion 17a is provided continuing from curved portion 16a. With respect to the flat plane of flat portion 17a, the highest portion of curved portion 16a is approximately 2 cm high. Bent portion 9b, which is approximately 8 mm long and bent approximately 90 degrees, is provided at the end of flat portion 17a. Clamp portion 18a, which is an approximately 5 mm-long projection, is provided at the tip of bent portion 9b. Furthermore, clamp portion 81b, which is a belt-like projection approximately 5 mm in height and width, is provided on the inner side of arm 7d.

Figure 20:
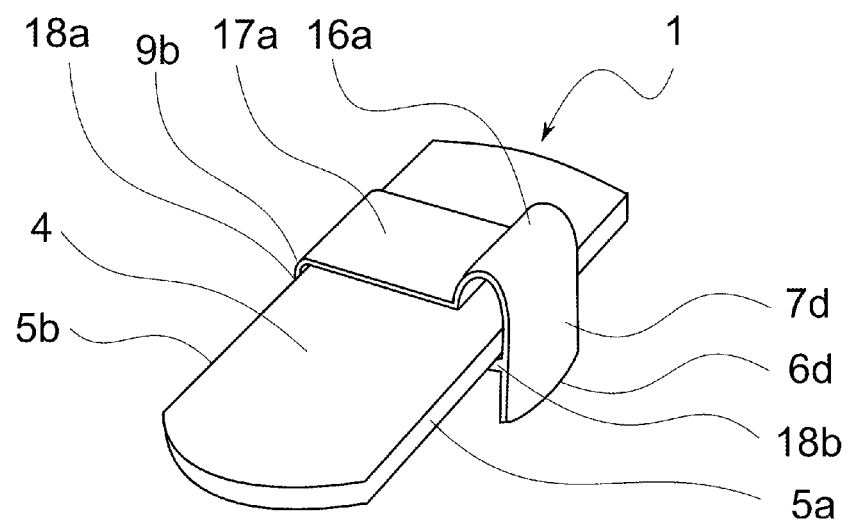
FIG. 20 is a perspective view of the back face of the mobile electronic terminal holder in Embodiment 4 of the present invention.
Figure 21:
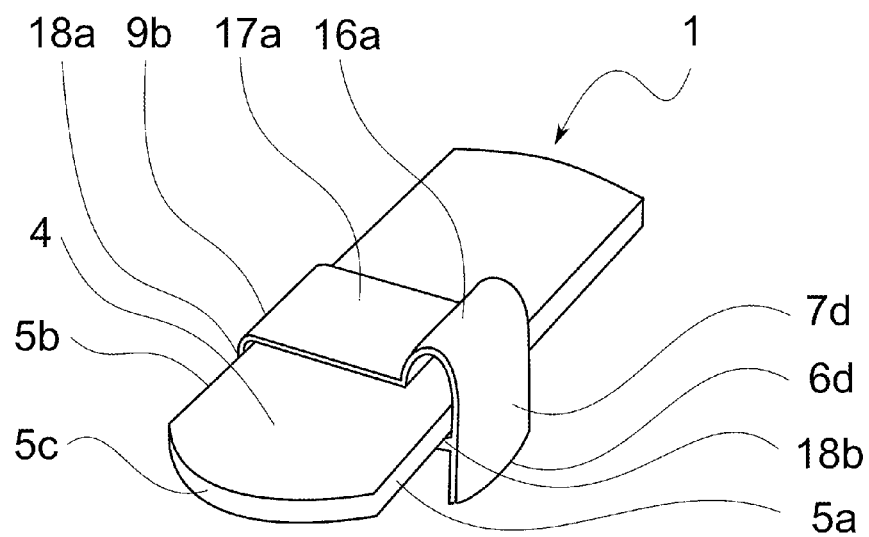
FIG. 21 is a perspective view of the back face of the mobile electronic terminal holder in Embodiment 4 of the present invention.

FIG. 20 illustrates the state where the above-described holder is attached to mobile electronic terminal 1. Specifically, mobile electronic terminal 1 is a PC tablet terminal that is approximately 20 cm long, 12 cm wide, and 1 cm thick. FIG. 20 is a perspective view of the back face of the mobile electronic terminal holder in Embodiment 4 of the present invention. Flat portion 17a is placed against back face 4, and lateral face 5b is clamped using clamp portion 18a. At the same time, arm 7d is brought into contact with lateral face 5a so that clamp portion 18b is brought around over to front face 2 (not illustrated) and clamps onto lateral face 5a. In other words, mobile electronic terminal 1 is fixed by having mutually opposed lateral face 5a and lateral face 5b sandwiched by clamp portion 18a, bent portion 9b, flat portion 17a, arm 7d, and clamp portion 18b. Since the distance between arm 7d and bend portion 9b is designed to be slightly shorter than the distance between lateral face 5a and lateral face 5b, the lateral faces are sandwiched with curved portion 16a being slightly pushed open. In addition, since the entire holder including curved portion 16a is made of plastic and therefore elastic, the holder is fixed to mobile electronic terminal 1 by way of the restoring force of such elasticity. Although this is a clamping structure in which each component is involved in a small way, arm 7d is directly fixed by way of the clamping stress exerted on clamping portion 18a and clamping portion 18b. With this fixing, the holder is attached to mobile electronic terminal 1 such that arm 7d projects perpendicularly on the front face 2-side, from the vicinity of lateral face 5a, and arm tip 6d extends approximately 3.5 cm from front face 2.

The method for holding such a holder is, in the same manner as the foregoing embodiments, by placing arm tip 6*d* against palm 36 (not illustrated), placing plural fingers other than the thumb around curved portion 16*a*, and applying light force so as to grip. Since curved 16*a* is a protrusion that is approximately 2 cm tall from flat portion 17*a* disposed on back face 4, the protrusion allows the plural fingers other than the thumb to hook on, and thus allows secure holding without slipping of the fingers. Since the gripping force translates to stress that pushes arm 7*d* inward, and clamp portion 18*b* is also pushed inward, the fixing between the holder and mobile electronic terminal 1 becomes even stronger. In addition, since, at this time, thumb 31 (not illustrated) is not involved in the holding by way of the above gripping, thumb 31 can perform inputting by freely pressing on the input unit. This thumb inputting is, as in each of the foregoing Embodiments, also the same as when mobile electronic terminal 1 is used by being viewed from below.

It should be noted that for the amount of protrusion of curved portion 16*a* from flat portion 17*a*, normally 2 cm to at most 3 cm is suitable because, if the protrusion is too high, the fingers would not be able to curl over completely. Furthermore, for the width of the arch formed by the curved portion, that is, the depth from lateral face 5*a* to flat portion 17*a*, normally 2 cm to at most 3 cm is suitable because, if the protrusion is too long, the fingers would also not be able to curl over completely. The suitable dimensions for this protrusion are determined by whether or not the fingers to can hook on to allow secure gripping. In other words, the suitable dimensions are determined by whether it is possible to grip using palm 36 and the fingertips. For this reason, the length from arm tip 6*d*, which abuts palm 36, to the portion of curved portion 16*a* which the fingers mainly hook onto needs to less than or equal to the length from ball-of-the-thumb 37 to the first joint of the middle finger. If the length from arm tip 6*d* to the portion of curved portion 16*a* which the fingers hook onto exceeds the aforementioned length, the tips of the fingers will not be able to hook on and secure holding will not be possible. On the other hand, a shortened length could still be addressed by using a smaller grip such as by hooking on using the second joints of the fingers. However, if the length becomes too short, greater gripping force is required and the load on the hand increases. In this embodiment, the specific length from the arm tip to the portion of the protrusion which the fingers hook onto is approximately 8 cm including the curved line portion of the curve. Although the fingertips hook on over a wide area because the curved portion is rounded, the approximately 8 cm described above is obtained by measuring, using a curve ruler, the main area which is considered to be around the intermediate 45 degrees past the apex of curved portion 16*a* up to flat portion 17*a*. It should be noted that a protrusion that has no corners and is rounded is better able to cope with various sizes of hands.

Since the holder in Embodiment 4 is attached merely by clamping which utilizes the elasticity of plastic, releasing the gripping force and pushing the holder toward lateral face 5*c* allows the holder to be slid along lateral face 5*a*. Like FIG. 20, FIG. 21 is a perspective view of the back face of the mobile electronic terminal holder in Embodiment 4 of the present invention. In FIG. 21, compared to the position in FIG. 20, the entire holder including arm 7*d* has been slid and moved toward lateral face 5*c* of the mobile electronic terminal. Sliding in this manner is possible because lateral face 5*a* and lateral face 5*b* are parallel. For this reason, position changing, such as bringing the arm tip to the top end-side (lateral face 5*c*-side) of mobile electronic terminal 1 or, conversely, bringing the arm tip to the bottom end-side (lateral face 5*d*-side), can be easily done by sliding along the lateral faces. In addition, sliding is very convenient when it is desired to change the area that can be reached during inputting using the thumb. In particular, in a PC tablet terminal, the size of the screen, that is, the input unit, is larger compared to a smartphone, and thus the area that can be reached from one location is limited. In view of this, if it is possible to easily change the fixing position of the thumb in the above manner, the area for inputting using the thumb is easily enhanced.

Each of the four foregoing embodiments describe an example in which holding is performed with the right hand and inputting is performed using the thumb of the right hand. However, exactly the same holding and inputting operations are possible even with the left hand. In such case, the attaching position of the holding unit is the mirror-reverse of the positions shown in each of the foregoing embodiments. In other words, by attaching a component attached on the lateral face 5*a*-side on the right on the lateral face 5*b*-side on the left, the left hand can also perform inputting steadily in the same manner as with the right hand. The holders illustrated in the figures in Embodiments 1, 2, 3, and 4 all have mirror-reversible forms. Therefore, the holder has commonality and interchangeability such that, when initially attaching the fixing portion to mobile electronic terminal 1, the fixing portion may be attached to the lateral face 5*a*-side on the right when the right hand is to be used, and the fixing unit may be attached to lateral face 5*b*-side on the left if the left hand is to be used.

In particular, the holder in Embodiment 4 is fixed by making use of the elasticity of the curved plastic, and thus attachment and detachment is easy. When arm tip 6*d* is held and pulled so as to widen curved portion 16*a*, the holder can be easily detached from mobile electronic terminal 1. Therefore, when the right hand is used and the hand gets tired, the holder can be immediately removed from mobile electronic terminal 1 and re-fitted in the mirror-reverse orientation to allow usage to be continued by holding using the left hand. If fatigue sets in, the holder may be re-fitted for right hand use, as it was before.

[Embodiment 5]

Figure 22:
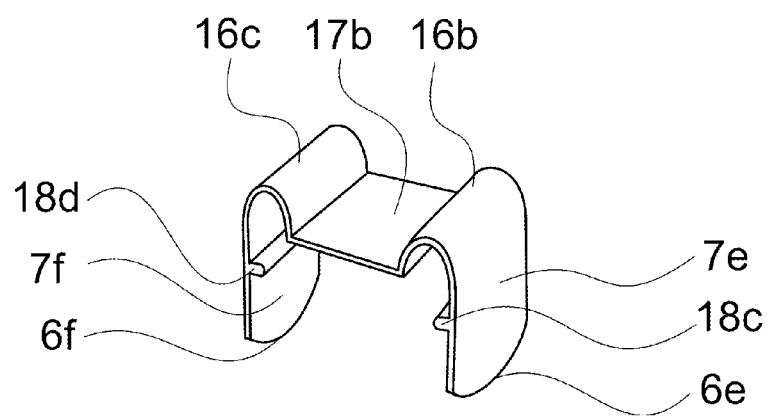
FIG. 22 is a perspective view of a mobile electronic terminal holder, on its own, in Embodiment 5 of the present invention.

The configuration of a mobile electronic terminal holder in Embodiment 5 will be described with reference to FIG. 22 to FIG. 24. In the respective figures, structural elements that are identical to those in Embodiments 1, 2, 3, and 4 are assigned the same reference signs. FIG. 22 is a perspective view of the mobile electronic terminal holder, on its own, in Embodiment 5 of the present invention. The holder is almost entirely configured by deforming a single plastic board that is 2 mm thick and 6 cm wide. A portion of the plastic board is arm 7*e* and the tip of arm 7*e* is arm tip 6*e*. Curved portion 16*b* is provided continuing from arm 7*e*, and is concave on the mobile electronic terminal-side. Flat portion 17*b* is provided continuing from curved portion 16*b*. Curved portion 16*c* is provided continuing from flat portion 17*b*. With respect to the flat plane of flat portion 17*b*, the highest portion of curved portion 16*a* and curved portion 16*b* is approximately 2 cm high. Arm 7*f* is disposed continuing from curved portion 16*c*. The tip of arm 7*f* is arm tip 6*f*. Furthermore, clamp portion 18*c* and clamp portion 18*d*, which are belt-like projections approximately 5 mm in height and width, are provided on the inner side of arm 7*e* and the inner side of arm 7*f*, respectively.

Figure 23:
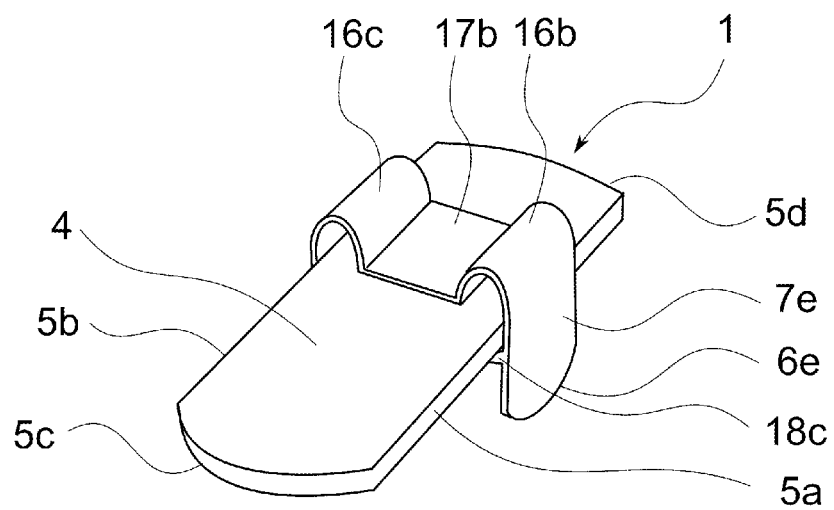
FIG. 23 is a perspective view of the back face of the mobile electronic terminal holder in Embodiment 5 of the present invention.
Figure 24:
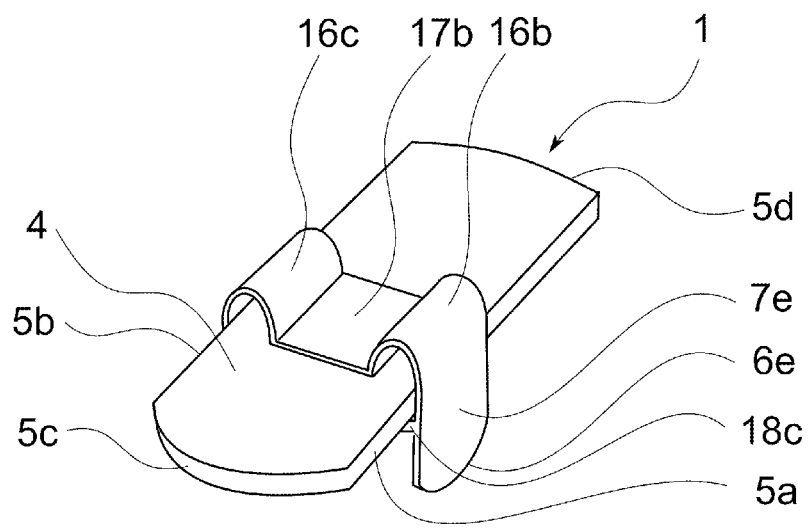
FIG. 24 is a perspective view of the back face of the mobile electronic terminal holder in Embodiment 5 of the present invention.

FIG. 23 illustrates the state where the above-described holder is fitted to mobile electronic terminal 1. A tablet terminal is given as a specific example of the mobile electronic terminal. FIG. 23 is a perspective view of the back face of the mobile electronic terminal holder in Embodiment 5 of the present invention. Flat portion 17b is placed against back face 4, arm 7e is brought into contact with lateral face 5a so that clamp portion 18c is brought around over to front face 2 (not illustrated) and clamps onto lateral face 5a. At the same time, arm 7f (not illustrated) is brought into contact with lateral face 5b so that clamp portion 18d is brought around over to front face 2 (not illustrated) and clamps onto lateral face 5b. Since the entire holder including curved portion 16b and curved portion 16c is made of plastic and therefore elastic, the holder is fixed to mobile electronic terminal 1 by way of the restoring force of such elasticity. In other words, back face 4 and mutually opposed lateral face 5a and lateral face 5b are sandwiched and clamped by clamp portion 18c, arm 7e, flat portion 17b, arm 7f, and clamp portion 18d. With this fixing by clamping, the holder is fitted to mobile electronic terminal 1 such that arm 7e projects perpendicularly on the front face 2-side from the vicinity of lateral face 5a, and arm tip 6e extends past front face 2. At the same time, the holder is fitted to mobile electronic terminal 1 such that arm 7f projects perpendicularly on the front face 2-side from the vicinity of lateral face 5b, and arm tip 6f extends past front face 2. In other words, each of the two arms is disposed so that there is one arm in the vicinity of each of the lateral faces on the left and right.

When holding using the right hand, the method of holding the holder is exactly the same as described in Embodiment 4. Arm tip 6e is placed against the palm of the right hand, the other fingers are placed against curved portion 16b, and arm 7e and curved portion 16b are gripped lightly. Curved portion 16b serves as a protrusion which the fingertips hook onto. The further strengthening of the fixing of the holder to mobile electronic terminal 1 brought about by the gripping force stress is also the same as in Embodiment 4.

At this time, the other arm 74 is not used. In addition, since arm 7f projects almost perpendicularly along lateral face 5b on the front face 2-side, arm 7f does not become a hindrance when pressing input unit 3 (not illustrated) using the thumb of the right hand, and when looking at the display unit which input unit 3 also doubles as.

Next, when holding using the left hand, it is sufficient to use a completely mirror-reverse hold as in the method used when holding with the right hand. In other words, arm tip 6f is placed against the palm of the left hand, and arm 7f and curved portion 16c are gripped lightly using the left hand. This allows inputting using the thumb of the left hand, in exactly the same manner as with the right hand. The right hand is not required. In this manner, in this embodiment, switching between holding using the right hand and the left hand becomes very easy. Switching to the left hand when tired holding using the right hand, and switching to the right hand when tired holding using the left hand, allows prolonged continuous holding and inputting.

Furthermore, since the holder is attached merely by clamping using the elasticity of plastic, pushing the holding toll in the direction of lateral face 5c of mobile electronic terminal 1 allows the holder to slide along lateral face 5a. Like FIG. 23, FIG. 24 is a perspective view of the back face of the mobile electronic terminal holder in Embodiment 5 of the present invention. In FIG. 24, the entire holder including arm 7e and arm 7f has been slid and moved, from the position in FIG. 23, to the top end side, that is, the lateral face 5c-side of the mobile electronic terminal. This sliding movement along lateral face 5a and lateral face 5b facilitates position changing such as bringing the arm tip to the top end side (lateral face 5c-side) or bringing the arm tip to the lower end side (lateral face 5d-side) of mobile electronic terminal 1. Since the holder slides easily, it is very convenient when it is desired to change the area that can be reached during inputting using the thumb.

It should be noted that the arm is not limited to only the two on the left and the right. There may also be arms at the top and bottom. The displays on most mobile electronic terminals are switchable between portrait and landscape. This embodiment describes an example in which two arms, at the left and right, are provided with respect to a portrait display. However, in the case of landscape display, having arms at the top and bottom, that is, at the two locations at lateral face 5c and lateral face 5d allows holding in a more natural posture. It is acceptable to have arms in all four lateral faces. Since these arms merely project forward, perpendicular to the front face when not in use, the arms do not get in the way of viewing the display and do not get in the way of thumb inputting. Having arms in the vicinity of each of plural lateral sides makes it convenient when immediately switching hands for holding.

[Embodiment 6]

Figure 25:
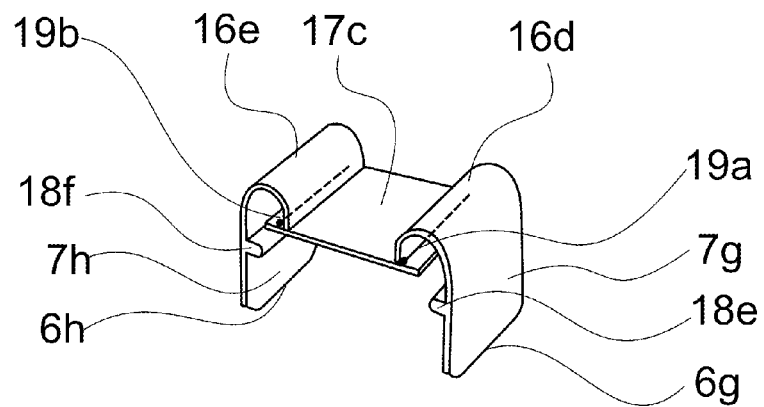
FIG. 25 is a perspective view of a mobile electronic terminal holder, on its own, in Embodiment 6 of the present invention.
Figure 26:
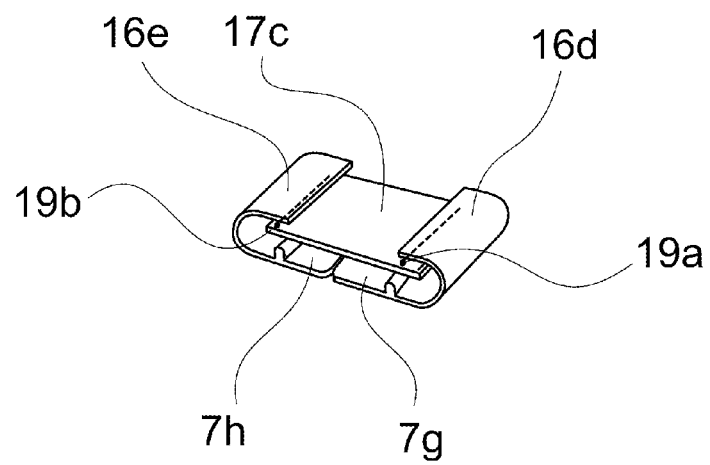
FIG. 26 is a perspective view of the mobile electronic terminal holder, on its own, in Embodiment 6 of the present invention, when not in use.

The configuration of a mobile electronic terminal holder in Embodiment 6 will be described with reference to FIG. 25 to FIG. 26. In the respective figures, structural elements that are identical to those in Embodiment 5 are assigned the same reference signs. FIG. 25 is a perspective view of the mobile electronic terminal holder, on its own, in Embodiment 6 of the present invention. FIG. 26 is a perspective view of the mobile electronic terminal holder, on its own, in Embodiment 6 of the present invention, when not in use. The form and method of use is similar to that shown in Embodiment 5 and FIG. 22. In other words, the holder is fitted to mobile electronic terminal 1 by placing flat portion 17c against back face 4 (not illustrated), bringing arm 7g into contact with lateral face 5a (not illustrated) so that clamp portion 18e is brought around over to front face 2 (not illustrated) and clamps onto lateral face 5a. At the same time, arm 7h is brought into contact with lateral face 5b (not illustrated) so that clamp portion 18f is brought around over to front face 2 and clamps onto lateral face 5b. In other words, each of the two arms is disposed so that there is one arm in the vicinity of each of the lateral faces on the left and right. In this manner, when in use, the holder can be used exactly like in Embodiment 5. It should be noted that the clamping mechanism will be described later.

In addition, when not in use, the holder can be removed and collapsed. Whereas the curved portions and the flat portion are coupled by bending a single board in Embodiment 5, in this embodiment, curved portion 16d and flat portion 17c are separate, and are coupled via hinge 19a. The rotating shaft of hinge 19a is parallel to back face 4 and lateral face 5a. By moving hinge 19a curved portion 16d which is in the standing position with respect to flat portion 17b as seen in FIG. 25 can be moved to the laid down position seen in FIG. 26. Arm 7g which is connected to and moves together with the curved portion is also moved and folded to the laid down position. In other words, arm 7g can be folded by rotating the hinge at the base of the arm. On the other hand, the relationship between curved portion 16e, which is the base of arm 7h, and flat portion 17c is the exactly same as above, and the axis of rotation of hinge 19b is parallel to back face 4 and lateral face 5b. In addition, by rotating about this axis of rotation, curved portion 16e and arm 7h which is connected to and moves together with curved portion 16e are folded to the laid down position. FIG. 26 is a perspective view showing the left and right arms folded. Although not the most compact due to the dimensions of the curved portion remaining as is when the curved portion itself is folded, the overall thickness is reduced to less than half compared to when the holder is in use.

When the holder is to be used again, both folded arms 7g and 7h are spread open to the standing position. Here, the distance between arm 7g and arm 7h that are parallel to each other is designed to be slightly shorter than the width of the mobile electronic terminal, that is, the distance between lateral face 5a and lateral face 5b. Therefore, when mobile electronic terminal 1 is sandwiched between the standing arms, arm portion 16d and arm portion 16e spread open slightly. Although the elastic restoring force acts as stress towards removing arm 7g and arm 7h from mobile electronic terminal 1, clamp portion 18e and clamp portion 18f attached to the respective arms receive this stress and prevent the holder from becoming detached. With such a clamping mechanism, the attachment becomes steady fixed state. In other words, by clamping lateral face 5a and lateral face 5b between clamp portion 18e and clamp portion 18f, the arms can be attached to the mobile electronic terminal. Stated accurately and in more detail, aside from clamp portion 18e and clamp portion 18f, arm 7g and arm 7h are also involved in order to create this fixed state; and aside from clamp portion 18e and clamp portion 18f, flat portion 17c is also involved in the fixing in the front and back direction of the mobile electronic terminal. Furthermore, the clamping force is generated from the elasticity of curved portions 16d and 16e. The above comprehensive effects are directly stated by using a description such as attaching by way of the clamping by clamp portion 18e and clamp portion 18f.

It should be noted that in the holder that is folded as in FIG. 26, there is a space of approximately 1 cm between flat portion 17c and arms 7g and 7h. Mobile electronic terminal 1 can also be inserted through this space. When carrying the mobile electronic terminal around, inserting the mobile electronic terminal in between the holding unit as described above is convenient because space is not taken up.

Furthermore, even in the state where the mobile electronic terminal is inserted between the folded holder as described above, as long as inputting is not performed, it is still possible to use, that is, to view, the mobile electronic terminal. In this case, it is convenient if arm 7g and arm 7h which come into contact with front face 2 are transparent. If arm 7g and arm 7h are transparent, the display on front face 2 can be seen through the arms. In other words, as long as it is only viewing, limited use is possible even when the arms are folded. In this case, since the input unit does not react even when pressed down by the arms, it is possible to view the display while gripping the mobile electronic terminal from above the input unit using the hand, by pressing with the thumb from above the arm and pushing against the flat portion on the back face-side using the other fingers.

[Embodiment 7]

Figure 27:
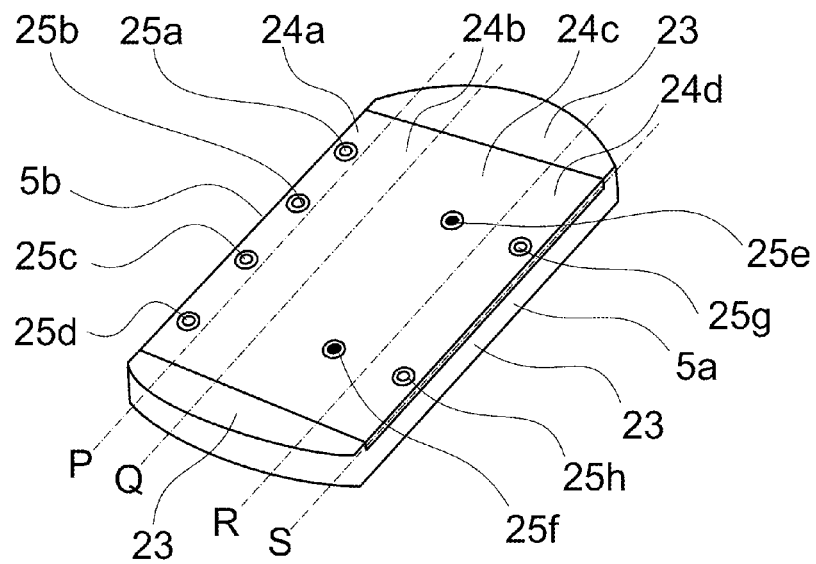
FIG. 27 is a perspective view of the front face of a mobile electronic terminal holder in Embodiment 7 of the present invention, when not in use.

The configuration of a mobile electronic terminal holder in Embodiment 8 will be described with reference to FIG. 27 to FIG. 28. In the respective figures, structural elements that are identical to those in the foregoing embodiments are assigned the same reference signs. FIG. 27 is a perspective view of the front face of the mobile electronic terminal holder in Embodiment 7 of the present invention, when not in use. In FIG. 27, mobile electronic terminal 1 (not illustrated) which, as a specific example, is a tablet terminal is placed completely inside case 23 having front face covers 24a, 24b, 24c, and 24d which are approximately 2 mm thick. The front face covers have an opening side on the lateral face 5b-side and are connected to case 23 on the lateral face 5a-side. The front face cover consists of four separate parts, 24a, 24b, 24c, and 24d that are connected and each of which is hard. In addition, the front face cover can swivel like a hinge and fold at the four straight line portions including: borderline P, borderline Q, and borderline R, which are borders, and borderline S between the front face cover and case 23. These borderlines are parallel to lateral face 5a and lateral face 5b. The widths of each of the four parts of the front face cover are as follows: front face cover 24a is 2 cm, front face cover 24b is 2.5 cm, front face cover 24c is 5 cm, and front face cover 24a is 2.5 cm. Four female hooks 25a, 25b, 25c, and 25d are recessed at the top of front face cover 24a. Two male hooks 25e and 25f are recessed at the top of front face cover 24c, and two female hooks 25g and 25h are recessed at the top of front face cover 24d. In this manner, when not in use, mobile electronic terminal 1 is covered completely by the front face cover and the case.

Figure 28:
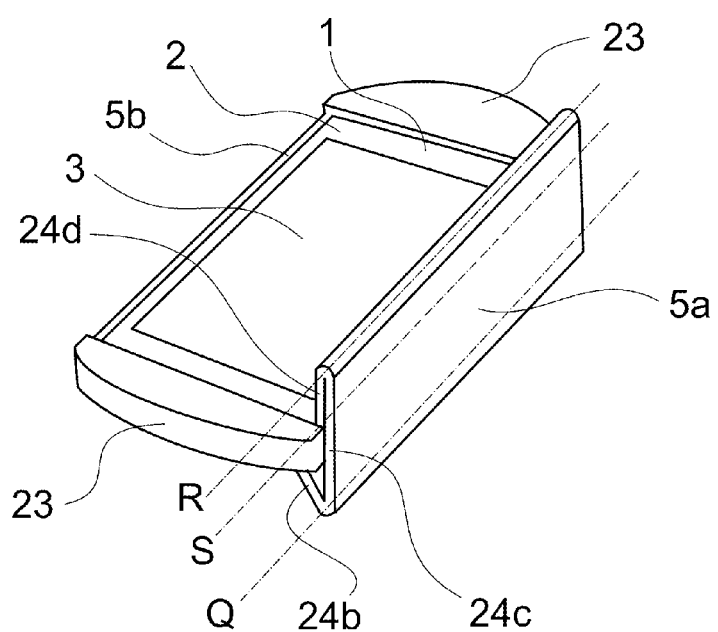
FIG. 28 is a perspective view of the front face of the mobile electronic terminal holder in Embodiment 7 of the present invention, when in use.

FIG. 28 is a perspective view of the front face of the mobile electronic terminal holder in Embodiment 7 of the present invention, when in use. When mobile electronic terminal 1 is to be used, the front face cover is opened to expose input unit 3 located on front face 2, as in FIG. 28. Specifically, front cover 24d is opened 90 degrees about borderline S. Front face cover 24c is opened 180 degrees about borderline R, with respect to front face cover 24d. At this time, male hook 25e and female hook 25g are in perfectly matching positions and thus engage with each other. At this time, male hook 25f and female hook 25h are in perfectly matching positions and thus engage with each other. In this manner, front face cover 24d and front face cover 24c are fixed to each other. In addition, front face cover 24b is opened 180 degrees about borderline Q, with respect to front face cover 24c. Consequently, front face cover 24a which is the edge portion of the front face cover abuts with the back face of case 23. Male hooks (not illustrated) are recessed in the vicinity of this abutting portion, at positions corresponding to female hooks 25a, 25b, 25c, and 25d. Here, folding front face cover 24a by several tens of degrees at borderline P causes the male and female hooks to engage. With this, front face covers 24a, 24b, 24c, and 24d are completely fixed and do not move freely.

FIG. 28 is a view in which the front face cover is opened and fixed as described above. Describing this shape in terms of the present invention, front face cover 24d and half of front face cover on the backside of front face cover 24d correspond to "an arm projecting, from the vicinity of a lateral face, in a direction perpendicular to the front face". In addition, the vicinity of borderline R corresponds to the tip of the arm. Furthermore, the remaining half of front face cover 24c and front face cover 24b correspond to "a protrusion which the fingertips can hook onto". Since the width of front face cover 24d is 2.5 cm, the portion corresponding to the arm extends forward by 2.5 cm with respect to the front face, from the vicinity of lateral face 5a. Furthermore, since the width of front face cover 24c is 5 cm, the portion corresponding to the protrusion is located 5 cm from the arm tip.

Mobile electronic terminal 1 is held by placing the portion of borderline R against the palm, extending the fingers other than the arm from front face cover 24c to front face cover 24b, and gripping with the tips of the fingers other than the thumb hooking onto front face cover 24b. Since the thumb is free, inputting on input unit 3 is performed using the thumb. The form of this configuration is similar to that in Embodiment 3. Furthermore, the advantages of this configuration are the same as described using FIG. 13 and FIG. 14, and the holding position can be changed easily merely by moving the hand so as to slide over the arm tip. Then, as a result of changing holds, inputting over a wide overall area becomes possible.

[Embodiment 8]

Figure 29:
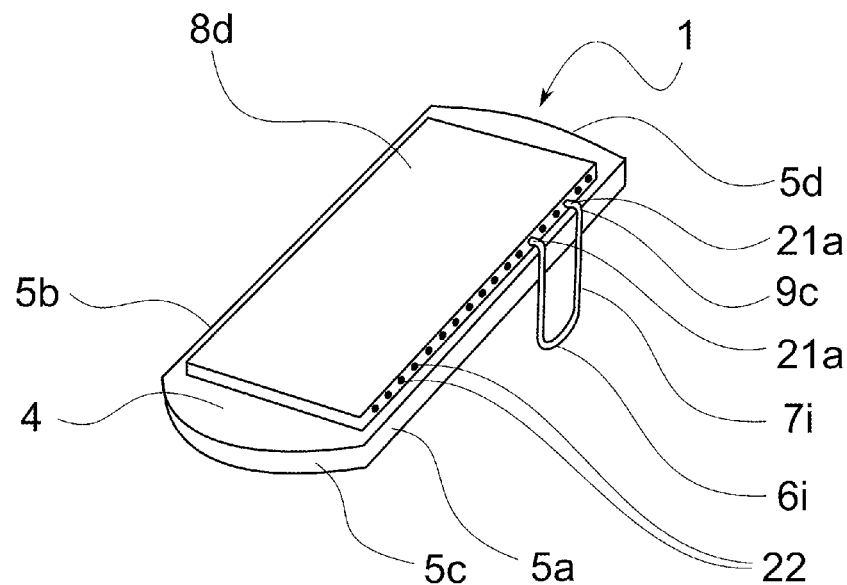
FIG. 29 is a perspective view of the back face of a mobile electronic terminal holder in Embodiment 8 of the present invention.

The configuration of a mobile electronic terminal holder in Embodiment 8 will be described with reference to FIG. 29 to FIG. 33. In the respective figures, structural elements that are identical to those in the foregoing embodiments are assigned the same reference signs. FIG. 29 is a perspective view of the back face of the mobile electronic terminal holder in Embodiment 8 of the present invention. A 4 mm thick fixing portion 8d is stuck and fixed to back face 4 of mobile electronic terminal 1 which, as a specific example, is a smartphone. Multiple through holes 22 are provided in fixing portion 8d. The through holes are parallel to one another, and have openings on the lateral face 5a-side and the lateral face 5b-side. Arm 7i is attached to fixing portion 8d, arm tip 6i extends forward on the front face-side of mobile electronic terminal 1, by a length from the fork of the thumb and middle finger up to the ball of the thumb. Specifically, the arm tip 6i projects forward of front face 2 (not illustrated) by a length of approximately 3 cm.

Figure 30:
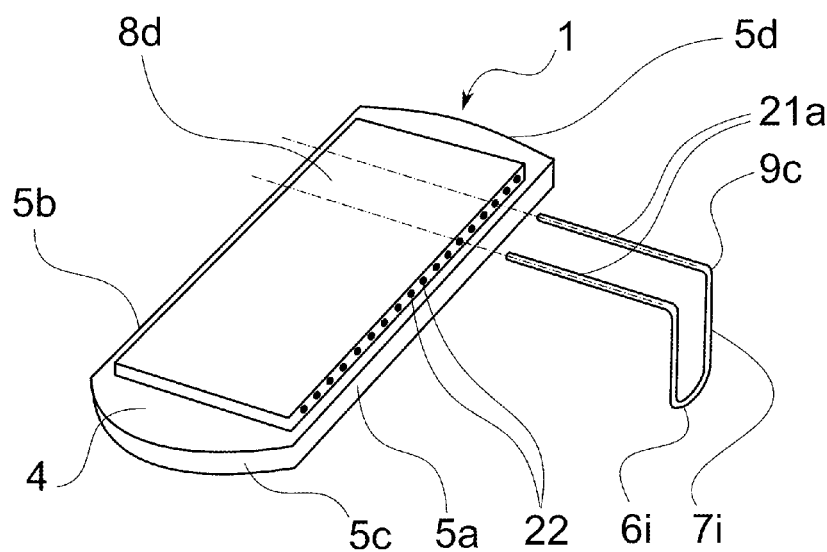
FIG. 30 is a perspective view of the back face of the mobile electronic terminal holder in Embodiment 8 of the present invention.

Like FIG. 29, FIG. 30 is a perspective view of the back face of the mobile electronic terminal holder in Embodiment 8, and is for describing the method of attaching arm 7i in more detail. Arm 7i is a configured by bending a metal wire that is approximately 2 mm in diameter. A portion at the center which is bent in a U-shape corresponds to arm tip 6i. Bent portions 9c are formed by bending the two sides of the metal wire at right angles at locations approximately 4 cm from the arm tip, and two insertion rods 21a which are 5 mm straight portions are formed from bent portions 9c. The arm is attached in an arm position such as that shown in FIG. 29 by inserting insertion rods 21a into through holes 22. Since the diameter of the metal wire of the arm and the diameter of through holes 22 are made to be extremely similar dimensions, the arm does not detach easily.

The method of holding the holder configured in the above manner is the same as described in Embodiment 1, and arm tip 6i is placed against the center of palm 36 (not illustrated). It is preferable that arm tip 6i be placed against a portion of the palm, immediately inward of ball-of-the-thumb 37 or ball-of-the-little finger 38. Then, the fingers (not illustrated) other than thumb 31 are curled over back face 4 of mobile electronic terminal 1 to press against fixing portion 8 which is fixed to the back face. Then holding is possible by gripping in the above state. In addition, since thumb 31 (not illustrated) can be moved freely, inputting is performed using thumb 31.

At this time, since the outer face of fixing portion 8d is flat, fingers are prone to slipping when force is applied for gripping. In view of this, providing this outer face with a slip stopper producing significant frictional force with the fingers as described in Embodiment 1, or providing a protrusion as described in Embodiments 2 and 3 would further facilitate holding.

In addition, the multiple through holes 22 aligned in fixing portion 8d in this embodiment allow for fine selection of the holes into which insertion rods 21a are to be inserted. In other words, the position of arm 7i can be finely adjusted. If a certain position has any shortcomings in terms of the thumb inputting area, insertion rods 21a can be moved one hole and reinserted to overcome such shortcomings.

Figure 31:
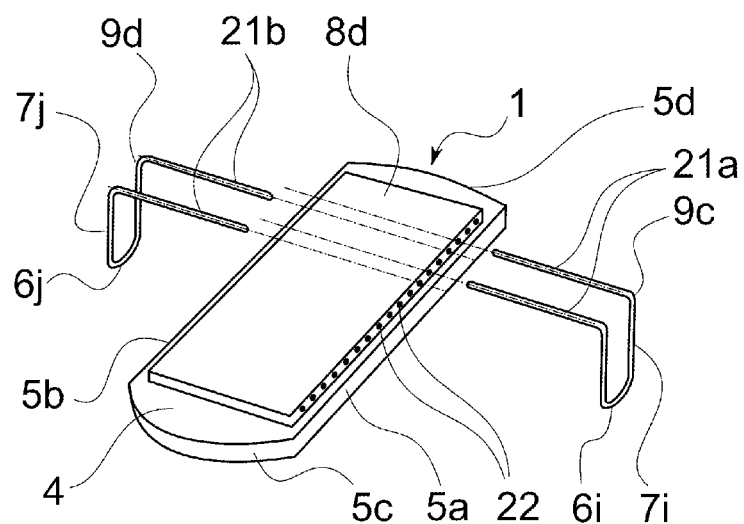
FIG. 31 is a perspective view of the back face of the mobile electronic terminal holder in Embodiment 8 of the present invention.

Like FIG. 30, FIG. 31 is a perspective view of the back face of the mobile electronic terminal holder in Embodiment 8 of the present invention, and describes an additional application regarding arm attachment. Here, the attachment of an arm on both the left and right sides of mobile electronic terminal 1 is illustrated. Here, the attachment of arm 7i is the same as in FIG. 30. In other words, insertion rods 21a are inserted into through holes 22 on the lateral face 5a-side of fixing portion 8d. Then, one more identical arm is provided. In other words, a separate arm 7j is provided, which is bent and connected to insertion rods 21b at bent portions 9d. Arm 7j is attached by inserting the two insertion rods 21b into corresponding through holes 22 on the lateral face 5b-side. Since multiple through holes 22 are aligned and penetrate through fixing portion 8d, inserting insertion rods 21b into through holes 22 that are beside those used by insertion portions 21a allows arm 7j and arm 7i to be attached at nearly symmetrical positions.

The mobile electronic terminal having the two arms attached in this manner can be used with both left and right hands. This offers the same advantages as described in Embodiment 5. In other words, although arm 7i is used when holding using the right hand, at this time, arm 7j neither blocks the view to the input unit, that is, the display unit, nor hinders inputting using the thumb. In addition, switching hands for holding can be performed very easily by instantaneously gripping arm 7j with the left hand and releasing the grip of the right hand. Even when holding using the left hand, the free arm 7i neither blocks the view to the display unit nor hinders inputting using the thumb of the left hand.

In addition, when the mobile electronic terminal will not be used, arm 7i and arm 7j can be detached by pulling out insertion rods 21a and insertion rods 21b. Insertion rods 21a and insertion rods 21b are made to have diameters that are extremely similar in dimension to through holes 22, and thus do not detach easily during normal operation. However, insertion rods 21a and insertion rods 21b can be detached from through holes 22 by being pulled out slowly in a straight line using slightly strong force.

It should be noted that attaching one arm on one of the sides does not require the holes to be through holes. Through holes are adopted in this embodiment in order to provide multiple holes side-by-side and attach arms in various positions from both the left and right directions.

Figure 32:
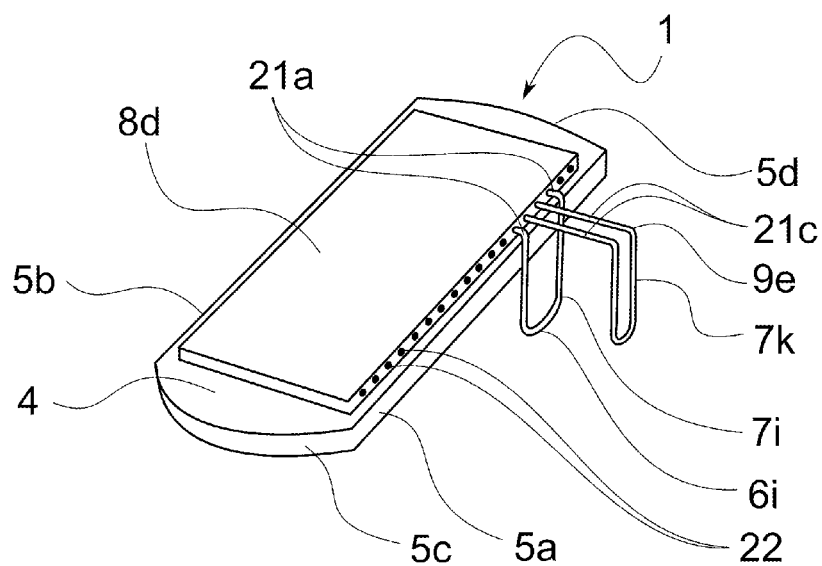
FIG. 32 is a perspective view of the back face of the mobile electronic terminal holder in Embodiment 8 of the present invention, when in use in a different manner.

Next, an application of Embodiment 8 will be described. FIG. 32 is a perspective view of the back face of the mobile electronic terminal holder in Embodiment 8 of the present invention, when in use in a different manner. Structural components in FIG. 32 that are identical as those in FIG. 30 and FIG. 31 are assigned the same reference signs. In this application, arm 7i identical to that illustrated in FIG. 30 is attached. Then, in addition, arm 7k is further attached. Arm 7k is bent and connected to insertion rods 21c at bent portions 9e. The two insertion rods 21c are inserted into through holes 22 which are located inward of insertion rods 21a. In addition, insertion rods 21c are not fully inserted, but are inserted with approximately 3 cm remaining exposed. In other words, there is a gap of approximately 3 cm between arm 7i and arm 7k.

Figure 33:
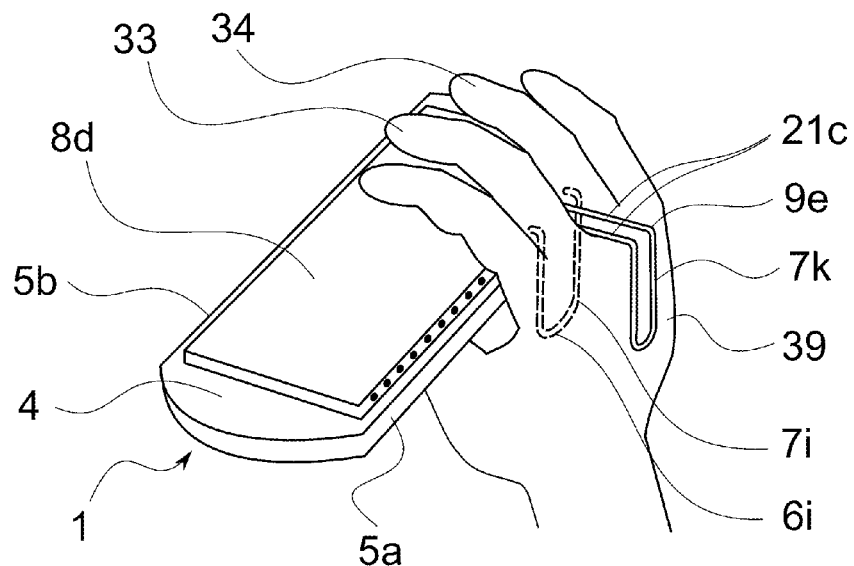
FIG. 33 is a perspective view of the mobile electronic terminal holder in Embodiment 8 of the present invention, when in use in a different manner.

Next, the method of holding the above-described holder having arms inserted in two layers will be described. FIG. 33 is a perspective view of the mobile electronic terminal holder in Embodiment 8 of the present invention, when in use in a different manner. Specifically, the figure illustrates a way of holding using the right hand for the above described application. Structural components that are identical as those in FIG. 30 to FIG. 32 are assigned the same reference signs. First, the palm of the right hand is inserted between arm 7i and arm 7k, and insertion rods 21c are positioned between middle finger 33 and ring finger 34. Next, arm 7i is placed against the palm, and the tips of the fingers other than the thumb are placed on and lightly grip fixing portion 8d on back face 4. With this, the hold is completed and, since the thumb moves freely, inputting is possible. This is identical to the basic form in Embodiment 8, described using FIG. 30.

The difference is that, even if the grip using the fingers other than the thumb is released, mobile electronic terminal 1 does not fall off from the hand. The reason for not falling off is that insertion rods 21c abut the fork of the fingers between middle finger 33 and ring finger 34 and arm 7k abuts back-of-the-hand 39, and thus support against the dropping force is provided. In this manner, inputting using the thumb of the right hand is possible while holding with the left hand, even without gripping.

It should be noted that, although in this embodiment the method of fixing between the insertion rods and the holes is by what is called "mutual fitting" in which the diameter of the insertion rods and the diameter of the through holes is made to approximate each other, the fixing method is not limited to such. A method which makes use of the elasticity of the metal rods forming the arm and the insertion rods is also available. Specifically, the gap between the two insertion rods is made slightly wider than the interval between the through holes into which they are inserted, and the insertion rods are inserted by applying force on both insertion rods so that they are clamped from both sides and the gap between the insertion rods match the interval between the holes. By doing so, elasticity causes the insertion rods to spread outward inside the holes and press against the inner wall of the holes. The frictional force caused by this pressing causes the insertion rods to become fixed in the holes.

Furthermore, as another fixing method, there is a method of fixing by providing a "barb", such as that at the end of a fishing hook, at the tip of the insertion rods. As yet another method of fixing, there is a method of using a stretchable and elastic material, such as a sponge, for the entire inner wall of the holes, and using the frictional force of this material to prevent the insertion rods from falling out. Although there are other various fixing methods that allow temporary fixing pulling out on demand, further description is omitted since this are not the subject matter of the present invention.

The subject matter of the present invention is holding a mobile electronic terminal using one hand and freely inputting using the thumb of that hand, as described in detail in the respective embodiments. In addition, such inputting using the thumb is possible even when the mobile electronic terminal is held at an angle for viewing from below.

[Embodiment 9]

Figure 34:
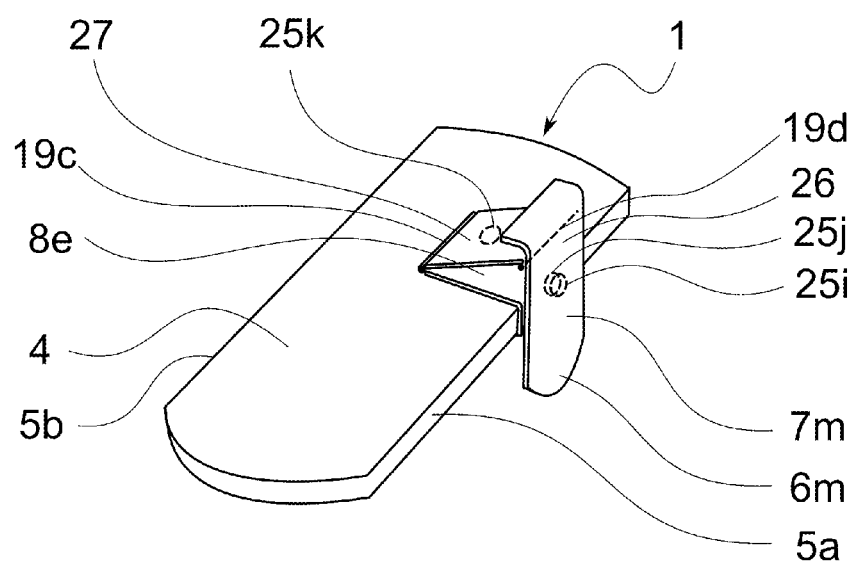
FIG. 34 is a perspective view of the back face of a mobile electronic terminal holder in Embodiment 9 of the present invention, when in use.
Figure 35:
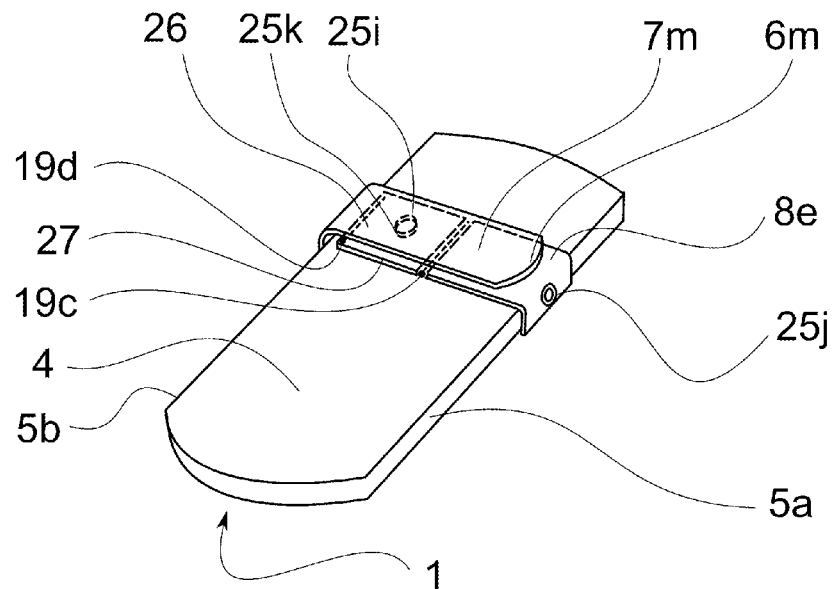
FIG. 35 is a perspective view of the back face of the mobile electronic terminal holder in Embodiment 9 of the present invention, when not in use.
Figure 36:
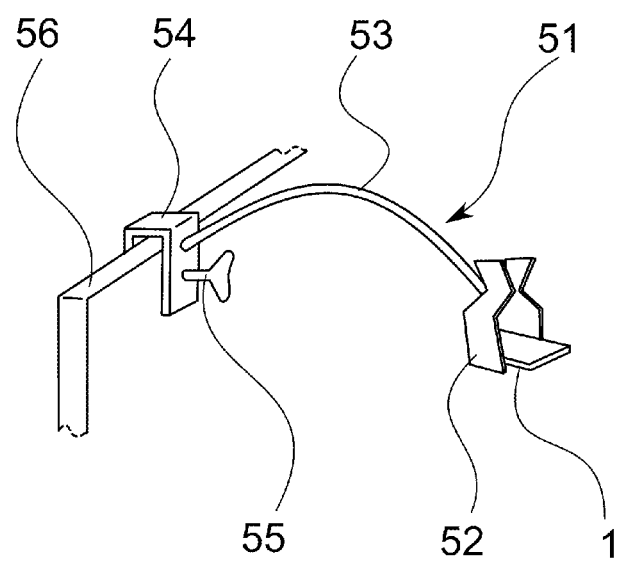
FIG. 36 is a perspective view of a conventional mobile electronic terminal holder when in use.

The configuration of a mobile electronic terminal holder in Embodiment 9 will be described with reference to FIG. 34 and FIG. 35. In the respective figures, structural elements that are identical to those in the foregoing embodiments are assigned the same reference signs. FIG. 34 is a perspective view of the back face of the mobile electronic terminal holder in Embodiment 9 of the present invention, when in use. Arm 7m projects almost perpendicularly to front face 2 (not illustrated) of mobile electronic terminal 1, from the vicinity of lateral face 5a of mobile electronic terminal 1, and arm tip 6m disposed at the tip of arm 7m extends approximately 3 cm forward from front face 2.

The side of arm 7m which is opposite to arm tip 6m continues to projection 26. In other words, arm 7m and projection 26 are made from a single flat board. The edge portion of projection 26 curves approximately 90 degrees inward (toward mobile electronic terminal 1). In addition, the length from arm tip 6m to the edge portion of projection 26 is approximately 7 cm. Hinge 19d is provided in a portion of the inner side of projection 26, and projection 26 is connected to one end of tabular intermediate board 27 via hinge 19d. The axis of rotation of hinge 19d is parallel to lateral face 5a and back face 4 of mobile electronic terminal 1. Hinge 19c is attached to the other end of intermediate board 27, and intermediate board 27 is connected to one end of tabular fixing portion 8e via hinge 19c. The axis of rotation of hinge 19c approximately follows back face 4. Fixing portion 8e is fixed to back face 4 using an adhesive. The other end of fixing portion 8e curves to lie along lateral face 5a. A female hook 25j is attached to the outer face of the portion of fixing portion 8e which lies along lateral face 5a. A male hook 25i is attached at approximately the middle portion between arm 7m and projection 26, and engages with hook 25j. With the above-described configuration, arm 7m is attached to mobile electronic terminal 1. The rotation of hinge 19c and hinge 19d allow arm 7m, projection 26, and intermediate board 27 to have a freely moving structure, whereas the engaging of hook 25i and hook 25j fixes the positions and immobilizes arm 7m, projection 26, and intermediate board 27.

The method of holding a mobile electronic terminal and holder such as those describe above is by placing arm tip 6m against palm 36 (not illustrated), placing index finger 32, middle finger 33, and ring finger 34 (not illustrated) against protrusion 26, and curling the tips of the fingers so as to hook the first joints of the fingers on the edge portion of the projection. Holding is possible by lightly gripping in the above state. Since the length from arm tip 6m to the edge of protrusion 26 is approximately 7 cm, this length is slightly shorter than the length from the ball of the thumb to the first joint of the middle finger of a person having normal sized hands, and thus gripping by hooking onto the holder with the palm and fingers. Projection 26 is curved and not angular, and is thus easy to follow with the respective fingers and thereby easy to grip. By holding in the above-described manner, thumb 31 (not illustrated) moves freely even when mobile electronic terminal 1 is held at an angle for viewing from below, and thus single-handed holding and input while viewing from below is possible. This is the same as in the foregoing embodiments.

Next, the method of folding the holder will be described. FIG. 35 is a perspective view of the back face of the mobile electronic terminal holder in Embodiment 9 of the present invention, when not in use. The figure illustrates the folded holder. When the engagement of hook 25i and 25j are released from the in-use state in FIG. 34, arm 7 and projection 26 move by swiveling freely about hinge 19d. Furthermore, at this time, intermediate board 27 also moves by swiveling freely about hinge 19c. Thus, intermediate board 27 is placed against back face 4. Then arm 7m and protrusion 26 are laid on top of intermediate board 27. At this time, a female hook 25k is provided at the center of intermediate board 27, and the male hook 25i described earlier engages with hook 25k. This fixes intermediate board 27 and arm 7m together. In addition, since arm tip 6m is in contact with fixing portion 8e, swiveling about hinge 19c is also stopped. Accordingly, the holder is folded over back face 4 in a compact manner and fixed.

As described thus far, none of the foregoing embodiments require a support column for fixing to be attached to a bed, etc., as in the conventional technique when a mobile electronic terminal is used while lying facing upward. Since it is possible to hold the mobile electronic terminal using one hand and perform inputting using the thumb of that hand, without a support column, moving from place to place can be done easily. In addition, since both operations of holding and inputting can be performed using one hand, the present invention has the remarkable advantageous effect of further increasing handling flexibility.

In addition, the holder is not limited to a method of attaching to lateral faces 5a and 5b on the right and left. Depending on the preference of individual users, the holder may be attached on the lateral face 5d-side at the bottom of mobile electronic terminal 1 and held as if being scooped up with the palm, and the holder may be attached on the lateral face 5c-side at the top and held as if being dangled. Furthermore, even when attaching the holder on a later face at the left or right, whether to attach the holder at a position near the top end (lateral face 5c-side) or near the bottom end (lateral face 5d-side) may be determined taking into consideration the size of the hand or the position of frequently pressed keys of each individual so that the holder is attached at the desired position.

Furthermore, the number of arms is not limited to one. Plural arms may be attached in the vicinity of any lateral face. The mobile electronic terminal can be held using the palm at the lateral face to which an arm is attached, and thus, with respect to the rectangular display unit of the mobile electronic terminal, two arms may be attached for the left and right as a holding method for viewing in the portrait orientation, and two arms may be attached for the top and bottom as a holding method for viewing in the landscape orientation. An arm may be attached to each of the four sides of a square mobile electronic terminal. When not used for gripping, the arms neither pose a hindrance to viewing nor pose a hindrance to thumb inputting at all.

It should be noted that although much of the description of the present invention is carried out using examples of an electrostatic capacitance input system mobile electronic terminal referred to as a smartphone, the present invention can be applied to all mobile electronic terminals in which inputting is of the fingertip pressing type. In other words, the present invention can also be applied to, for example, the button input types of BlackBerry (trademark of BlackBerry Limited) for mobile phones, and may also be applied to mobile personal computers referred to as tablet terminals.

It should be noted that although the respective embodiments show many examples in which a holder including a fixing portion and an arm(s) is fitted to a portion of a mobile electronic terminal, the fitting portion may be a case which completely covers the back face and the lateral faces of the mobile electronic terminal. In addition, instead of being fitted afterwards, the holder may be fitted to the body of the mobile electronic terminal right from the start.

INDUSTRIAL APPLICABILITY

The mobile electronic terminal holder according to the present invention enables, through a simple means, reliable holding of a mobile electronic terminal and single-handed input operation when holding at an angle for viewing from below, and is thus useful.

REFERENCE SIGNS LIST 1 mobile electronic terminal
2 front face
3 input unit
4 back face
5a, 5b, 5c, 5d lateral face
6a, 6b, 6c, 6d, 6e, 6f, 6g, 6h, 6i, 6j, 6m arm tip
7a, 7b, 7c, 7d, 7e, 7f, 7g, 7h, 7i, 7j, 7k, 7m arm
8a, 8b, 8c, 8d, 8e fixing portion
9a, 9b, 9c, 9d, 9e bent portion
10 adhesive
11 rough face portion
12a, 12b, 12c block
13a, 13b, 13c, 13d shaft hole
14a, 14b bump
16a, 16b, 16c, 16d, 16e curved portion
17a, 17b, 17c flat portion
18a, 18b, 18c, 18d, 18e, 18f clamp portion
19a, 19b, 19c, 19d hinge
21a, 21b, 21c insertion rod
22 through hole
23 case
24a, 24b, 24c, 24d front face cover
25a, 25b, 25c, 25d, 25e, 25f, 25g, 25h, 25i, 25j, 25k hook
26 projection
27 intermediate board
31 thumb
32 index finger
33 middle finger
34 ring finger
35 little finger
36 palm
37 ball-of-the-thumb
38 ball-of-the-little finger
39 back-of-the-hand
41 head
42 face
43 arm
44 hand
45 pillow
46 bed
51 arm stand
52 clip
53 support column
54 clamp
55 wing screw
56 bed headboard

The invention claimed is:

1. A mobile electronic terminal holder that is attached to a mobile electronic terminal having a front face which has an input unit for inputting by pressing using a finger, a back face on a side opposite to the front face, and a lateral face between the front face and the back face, the mobile electronic terminal having a substantially quadrangular tabular shape, the mobile electronic terminal holder comprising an arm that projects from a vicinity of the lateral face of the input unit, in a direction perpendicular to the front face,
wherein a length from the front face to a tip of the arm is at least 2 cm and at most 7 cm, and
the mobile electronic terminal holder enables inputting by pressing the input unit using a thumb of a hand while the mobile electronic terminal is held by the tip of the arm being placed against a center portion of a palm of the hand, the back face being supported by fingers of the hand other than the thumb which are placed against the back face, and the mobile electronic terminal and the arm being gripped between the center portion of the palm and the fingers.

2. The mobile electronic terminal holder according to claim 1,
wherein the tip of the arm is wide and has a rounded shape.

3. The mobile electronic terminal holder according to claim 1, comprising
a slip stopper provided on a portion disposed above the back face against which the fingers are placed.

4. The mobile electronic terminal holder according to claim 1, comprising
a protrusion provided on a portion disposed above the back face against which the fingers are placed, onto which tips of the fingers are hooked.

5. The mobile electronic terminal holder according to claim 4, comprising
a front face cover which covers the front face of the mobile electronic terminal,
wherein the arm is formed by the front face cover being opened and folded along a straight line parallel to the lateral face, and
the protrusion is formed by the front face cover being further folded along a straight line parallel to the lateral face and an edge portion of the front face cover is fixed to the back face.

6. The mobile electronic terminal holder according to claim 1,
wherein the arm includes, at a base, a hinge having an axis of rotation parallel to the lateral face, and the arm is folded by the hinge being rotated, when the mobile electronic terminal is not in use.

7. The mobile electronic terminal holder according to claim 1, comprising
a curved portion which continues from the arm and is concave on a side facing the mobile electronic terminal.

8. The mobile electronic terminal holder according to claim 1,
wherein the arm is transparent.

9. The mobile electronic terminal holder according to claim 1,
wherein the arm has a hollow portion.

10. The mobile electronic terminal holder according to claim 1, comprising
a clamp portion,
wherein the arm is attached to the mobile electronic terminal by clamping the lateral face using the clamp portion.

11. The mobile electronic terminal holder according to claim 10,
wherein the arm slides along the lateral face when the clamp portion is slid along the lateral face.

12. The mobile electronic terminal holder according to claim 1,
wherein the arm comprises a plurality of arms and the lateral face comprises a plurality of lateral faces, each of the plurality of arms being provided in a vicinity of a different one of the plurality of lateral faces.

13. The mobile electronic terminal holder according to claim 1, comprising:
an insertion rod connected to the arm; and
a fixing portion attached to the back face,
wherein the fixing portion has a hole opened on a lateral face-side, and
the arm is attached to the mobile electronic terminal by the insertion rod being inserted in the hole.

14. A method of holding a mobile electronic terminal having a front face which has an input unit for inputting by pressing using a finger, a back face on a side opposite to the front face, and a lateral face between the front face and the back face, the mobile electronic terminal having a substantially quadrangular tabular shape, the method comprising:
attaching an arm in a vicinity of the lateral face, the arm having a tip that projects by a length of at least 2 cm and at most 7 cm from the front face;
placing the tip of the arm against a center portion of a palm of a hand;
placing fingers of the hand other than the thumb against the back face;
holding the mobile electronic terminal and the arm between the center portion of the palm and the fingers; and
inputting by pressing the input unit using the thumb.

15. A mobile electronic terminal comprising the mobile electronic terminal holder according to claim 1.

* * * * *